US008659504B2

(12) United States Patent
Imamura et al.

(10) Patent No.: US 8,659,504 B2
(45) Date of Patent: Feb. 25, 2014

(54) DISPLAY DEVICE AND DISPLAY METHOD

(75) Inventors: Kentarou Imamura, Osaka (JP);
Shigeto Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 230 days.

(21) Appl. No.: 13/138,246

(22) PCT Filed: May 14, 2010

(86) PCT No.: PCT/JP2010/058222
§ 371 (c)(1),
(2), (4) Date: Jul. 22, 2011

(87) PCT Pub. No.: WO2010/137473
PCT Pub. Date: Dec. 2, 2010

(65) Prior Publication Data
US 2011/0279487 A1    Nov. 17, 2011

(30) Foreign Application Priority Data

May 29, 2009   (JP) ................................. 2009-131553

(51) Int. Cl.
*G09G 3/36*    (2006.01)
(52) U.S. Cl.
USPC ............................ 345/1.3; 345/102; 345/690
(58) Field of Classification Search
None
See application file for complete search history.

(56) References Cited

U.S. PATENT DOCUMENTS

| 6,292,157 | B1 * | 9/2001  | Greene et al. ................... 345/1.3 |
| 6,483,482 | B1 * | 11/2002 | Kim ................................ 345/3.1 |
| 7,830,469 | B2 * | 11/2010 | Kim et al. ........................ 349/58 |
| 8,279,351 | B2 * | 10/2012 | Bakhmutsky .................. 348/674 |
| 2008/0316167 | A1 * | 12/2008 | Kurokawa et al. ............ 345/102 |
| 2011/0025594 | A1 |  2/2011 | Watanabe |
| 2011/0134150 | A1 |  6/2011 | Imamura |

FOREIGN PATENT DOCUMENTS

| JP | 60-202422 | 10/1985 |
| JP | 07-128652 | 5/1995 |
| JP | 2000-056713 | 2/2000 |
| JP | 2001-005414 | 1/2001 |
| WO | WO 2009/122691 | 10/2009 |
| WO | WO 2010/047344 | 4/2010 |

OTHER PUBLICATIONS

International Search Report dated Aug. 10, 2010 for International Application No. PCT/JP2010/058222.

* cited by examiner

*Primary Examiner* — Joseph Haley
(74) *Attorney, Agent, or Firm* — Harness, Dickey & Pierce

(57) ABSTRACT

Provided is a display device for carrying out seamless display so that a sense of strangeness is not given to a viewer or the sense of strangeness is reduced. In at least one example embodiment, a display device that displays an image based on image signals DAT, includes: a display panel having (i) a display area in which a plurality of display elements for displaying the image are disposed in a matrix and (ii) a frame area which is located at an end of the display panel and in which no display element is provided; a backlight device which emits light, in a form of plane emission, towards a surface opposite to a display surface of the display area; and a light guide element which is provided on the display panel and which changes a light path of part of light emitted from the plurality of display elements so that the part of light is guided to the frame area, and luminance per unit area in a light-emitting surface of the backlight device is larger in a display area end portion where the light guide element is provided than in a normal display area where the light guide element is not provided out of the display area.

17 Claims, 17 Drawing Sheets

F I G. 9
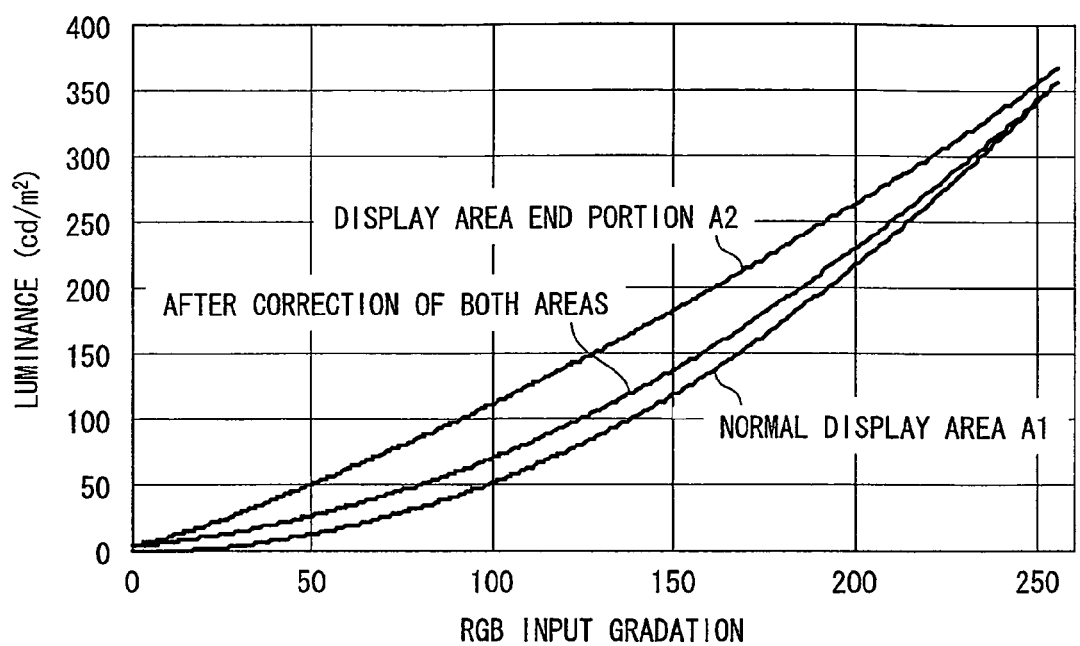

F I G. 1 0

| INPUT GRADATION | NORMAL DISPLAY AREA A1 (LUT2) OUTPUT GRADATION | DISPLAY AREA END PORTION A2 (LUT1) OUTPUT GRADATION |
|---|---|---|
| 0 | 27 | 0 |
| 1 | 28 | 0 |
| 2 | 29 | 1 |
| 3 | 30 | 1 |
| 4 | 31 | 2 |
| 5 | 32 | 2 |
| 6 | 32 | 3 |
| 7 | 33 | 3 |
| 8 | 34 | 4 |
| 9 | 35 | 4 |
| 10 | 36 | 5 |
| 11 | 37 | 5 |
| ⋮ | ⋮ | ⋮ |
| 247 | 248 | 240 |
| 248 | 249 | 241 |
| 249 | 250 | 243 |
| 250 | 250 | 244 |
| 251 | 251 | 245 |
| 252 | 252 | 246 |
| 253 | 253 | 247 |
| 254 | 254 | 249 |
| 255 | 255 | 250 |

F I G. 1 1
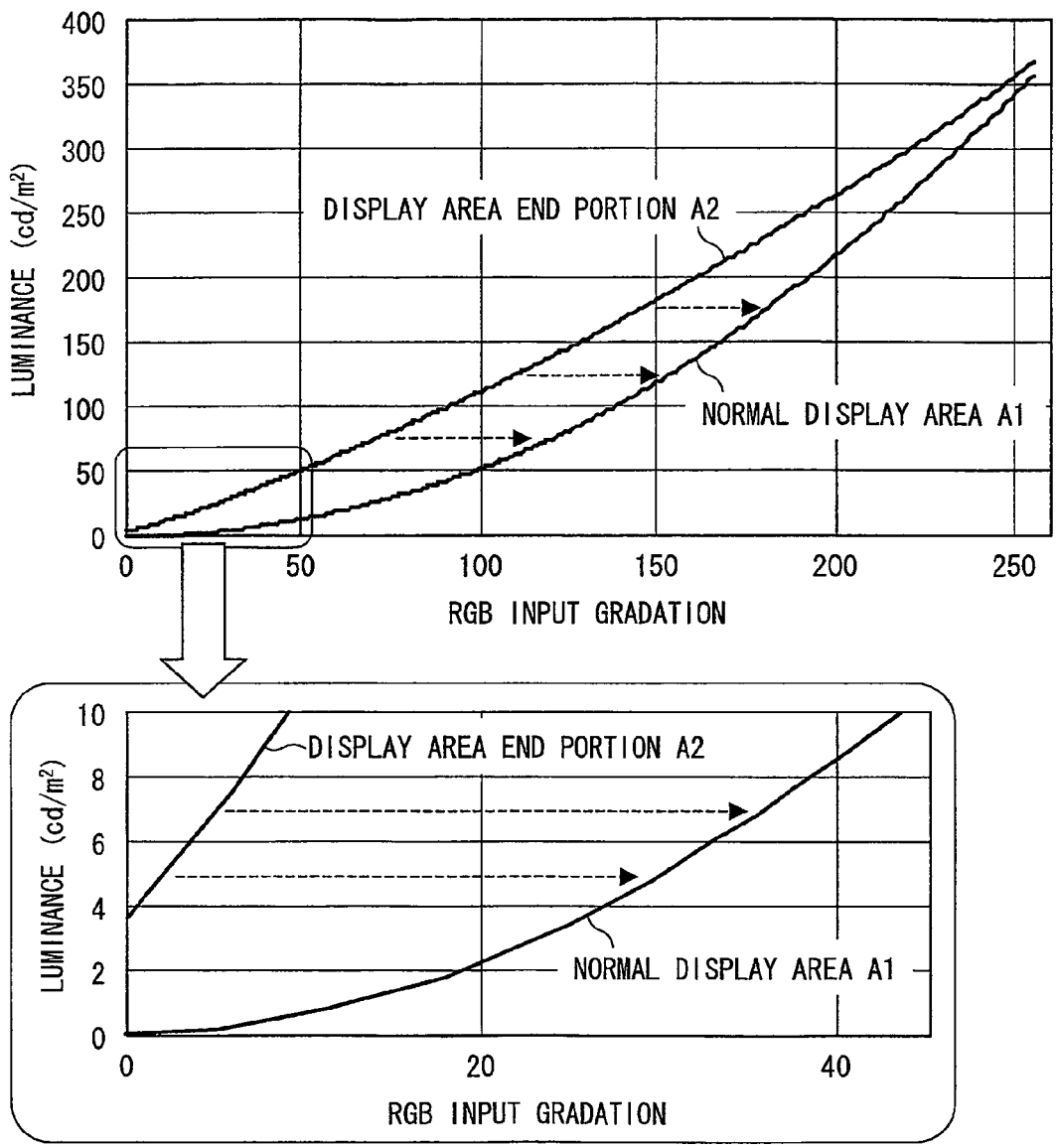

FIG. 17

GRADATION CORRECTION PATTERN 1 LUT

| INPUT GRADATION | OUTPUT GRADATION IN NORMAL DISPLAY AREA A1 | OUTPUT GRADATION IN DISPLAY AREA END PORTION A2 |
|---|---|---|
| 28 | 28 | 0 |
| 29 | 29 | 1 |
| 30 | 30 | 1 |
| 31 | 31 | 2 |
| 32 | 32 | 2 |
| ... | ... | ... |
| 131 | 131 | 83 |
| 132 | 132 | 84 |
| 133 | 133 | 85 |
| 134 | 134 | 87 |
| 135 | 135 | 88 |
| 136 | 136 | 89 |
| ... | ... | ... |
| 250 | 250 | 244 |
| 251 | 251 | 245 |
| 252 | 252 | 246 |
| 253 | 253 | 247 |
| 254 | 254 | 249 |
| 255 | 255 | 250 |

GRADATION CORRECTION PATTERN 2 LUT

| INPUT GRADATION | OUTPUT GRADATION IN NORMAL DISPLAY AREA A1 | OUTPUT GRADATION IN DISPLAY AREA END PORTION A2 |
|---|---|---|
| 0 | 0 | 0 |
| 1 | 1 | 0 |
| 2 | 2 | 0 |
| 3 | 3 | 0 |
| 4 | 4 | 0 |
| ... | ... | ... |
| 25 | 25 | 12 |
| 26 | 26 | 13 |
| 27 | 27 | 14 |
| 28 | 28 | 15 |
| 29 | 29 | 16 |
| 30 | 30 | 17 |
| ... | ... | ... |
| 131 | 131 | 248 |
| 132 | 132 | 250 |
| 133 | 133 | 253 |
| 134 | 134 | 255 |
| 135 | 135 | 255 |
| 136 | 136 | 255 |

GRADATION CORRECTION PATTERN 3 LUT

| INPUT GRADATION | OUTPUT GRADATION IN NORMAL DISPLAY AREA A1 | OUTPUT GRADATION IN DISPLAY AREA END PORTION A2 |
|---|---|---|
| 0 | 0 | 22 |
| 1 | 1 | 23 |
| 2 | 2 | 24 |
| 3 | 3 | 25 |
| 4 | 4 | 26 |
| ... | ... | ... |
| 25 | 25 | 143 |
| 26 | 26 | 152 |
| 27 | 27 | 161 |
| 28 | 28 | 171 |
| 29 | 29 | 181 |
| 30 | 30 | 191 |
| ... | ... | ... |
| 250 | 250 | 255 |
| 251 | 251 | 255 |
| 252 | 252 | 255 |
| 253 | 253 | 255 |
| 254 | 254 | 255 |
| 255 | 255 | 255 |

DISPLAY DEVICE AND DISPLAY METHOD

TECHNICAL FIELD

The present invention relates to a display device and a display method. More specifically, the present invention relates to a display device (hereinafter referred to as seamless display) and a display method, in each of which a seamless screen is achieved with the use of a plurality of display panels.

BACKGROUND ART

In recent years, there is an increasing demand for a light and thin display. Especially, active matrix type liquid crystal display devices using a large liquid crystal panel are in wide spread use. However, an increase in size of a liquid crystal panel poses many technical restrictions. In view of this, attempts have been conventionally made for seemingly increasing a size of a liquid crystal panel by combining a plurality of display devices.

However, since each of the display devices has a frame region, the attempts cause a problem that seams between the plurality of display devices are visible. This problem is not a problem specific to liquid crystal display devices, but is a problem common to direct-view-type display devices such as a PDP and an organic EL display device.

Patent Literature 1 for example discloses an arrangement in which light emitted from a display area is guided to a non-display area by a fiber optic faceplate covering an entire surface of a display panel so that a seamless image is displayed.

Patent Literature 2 discloses an arrangement in which a fiber optic faceplate complex is provided on an entire surface of a display panel on which display units are provided in a tile-like manner, and in each of the display units, light emitted from a display area is guided, by an individual fiber optic faceplate, to a non-display area formed around the display area so as to be expanded. Thus, an image that is seamless on the whole is displayed.

Patent Literature 3 discloses an arrangement in which light compensation means including (i) a large number of tilted thin films tilted at a predetermined angle and (ii) a transparent member that fills in between the tilted thin films is provided on an almost entire surface of a display panel, and light emitted from a display area is guided to a non-display area by the light compensation means so that a seamless image is displayed.

CITATION LIST

Patent Literature 1

Japanese Patent Application Publication, Tokukaihei, No. 7-128652 A (Publication Date: May 19, 1995)

Patent Literature 2

Japanese Patent Application Publication, Tokukai, No. 2000-56713 A (Publication Date: Feb. 25, 2000)

Patent Literature 3

Japanese Patent Application Publication, Tokukai, No. 2001-5414 A (Publication Date: Jan. 12, 2001)

SUMMARY OF INVENTION

Technical Problem

However, the techniques disclosed in Patent Literatures 1 through 3 require a fiber optic faceplate covering an almost entire surface of display panel or light compensation means including a large number of tilted thin films and a transparent member that fills in between the tilted thin films. Accordingly, from the perspective of manufacturing method and cost, the techniques disclosed in Patent Literatures 1 through 3 are not practical especially for large-size display devices.

Further, in a case where light path changing means is used corresponding to a seam part of a display panel, a part of a displayed image that corresponds to the seam part suffers from a reduction in luminance and a color shift that are different from the other portions. This gives a sense of strangeness to a viewer even in a case where a seamless image is displayed.

The present invention was attained in view of the above problems, and an object of the present invention is to provide a display device and a display method for carrying out seamless display so that a sense of strangeness is not given to a viewer or the sense of strangeness is reduced.

Solution to Problem

In order to attain the above object, a display device of the present invention that displays an image based on image signals, includes: at least one display panel having (i) a display area in which a plurality of display elements for displaying the image are disposed in a matrix and (ii) a frame area which is located at an end of the at least one display panel and in which no display element is provided; a backlight which emits light, in a form of plane emission, towards a back surface opposite to a display surface of the display area; and a light guide element which is provided on the at least one display panel and which changes a light path of part of light emitted from the plurality of display elements so that the part of light is guided to the frame area, luminance per unit area in a light-emitting surface of the backlight being larger in an area where the light guide element is provided than in an area where the light guide element is not provided out of the display area.

In order to attain the above object, a display method of the present invention for a display device including: a display panel having (i) a display area in which a plurality of display elements for displaying an image based on image signals are disposed in a matrix and (ii) a frame area which is located at an end of the display panel and in which no display element is provided; a backlight which emits light, in a form of plane emission, towards a back surface opposite to a display surface of the display area; and a light, guide element which is provided on the display panel and which changes a light path of part of light emitted from the plurality of display elements so that the part of light is guided to the frame area, includes the step of causing luminance of the backlight per unit area to be larger in an area where the light guide element is provided than in an area where the light guide element is not provided.

According to the arrangement, the light guide element guides parts of light emitted from the display elements to the frame area where no display element is provided. This makes it possible to provide a display device that can display an image also in the frame area.

In this case, the luminance per unit area in the light-emitting surface of the backlight is relatively larger in the area where the light guide element is provided. This makes it possible to compensate a reduction in luminance caused by the light guide element.

This produces an effect of reducing a difference in luminance from the display device between the area where the light guide element is provided and the area where the light guide element is not provided so that a viewer does not feel a sense of strangeness.

Note that an arrangement of each of the display elements is not limited to a specific one, provided that it can modulate transmittance of light emitted from the backlight in accordance with an image signal.

Advantageous Effects of Invention

According to the display device and the display method of the present invention, since the luminance per unit area in the light-emitting surface of the backlight is larger in the area where the light guide element is provided than in the area where the light guide element is not provided out of the display area, it is possible to compensate a reduction in luminance caused by the light guide element, as described above. This produces an effect of reducing a difference in luminance of the display device between the area where the light guide element is provided and the area where the light guide element is not provided so that a viewer does not feel a sense of strangeness.

BRIEF DESCRIPTION OF DRAWINGS

FIG. 9 is a graph showing gradation-luminance characteristics of the liquid crystal display device in the normal display area and the display area end portion which are obtained in a case where the present invention is used.

FIG. 10 is a diagram illustrating an example of an LUT included in the RAM for RGB shown in FIG. 7.

FIG. 11 is a graph showing gradation-luminance characteristics of the liquid crystal display device in the normal display area and the display area end portion which are obtained in a case where the present invention is used.

FIG. 17 is a diagram showing an example of an LUT included in the RAM for RGB shown in FIG. 14 for each of the backlight correction patterns.

DESCRIPTION OF EMBODIMENTS

Embodiment 1

An embodiment of the present invention is described below with reference to FIGS. 1 through 9. Note that dimensions, materials, shapes, relative positions etc. of the constituent members described in the present embodiment are cited merely by way of example and without limitation, unless otherwise specified.

Figure 2:
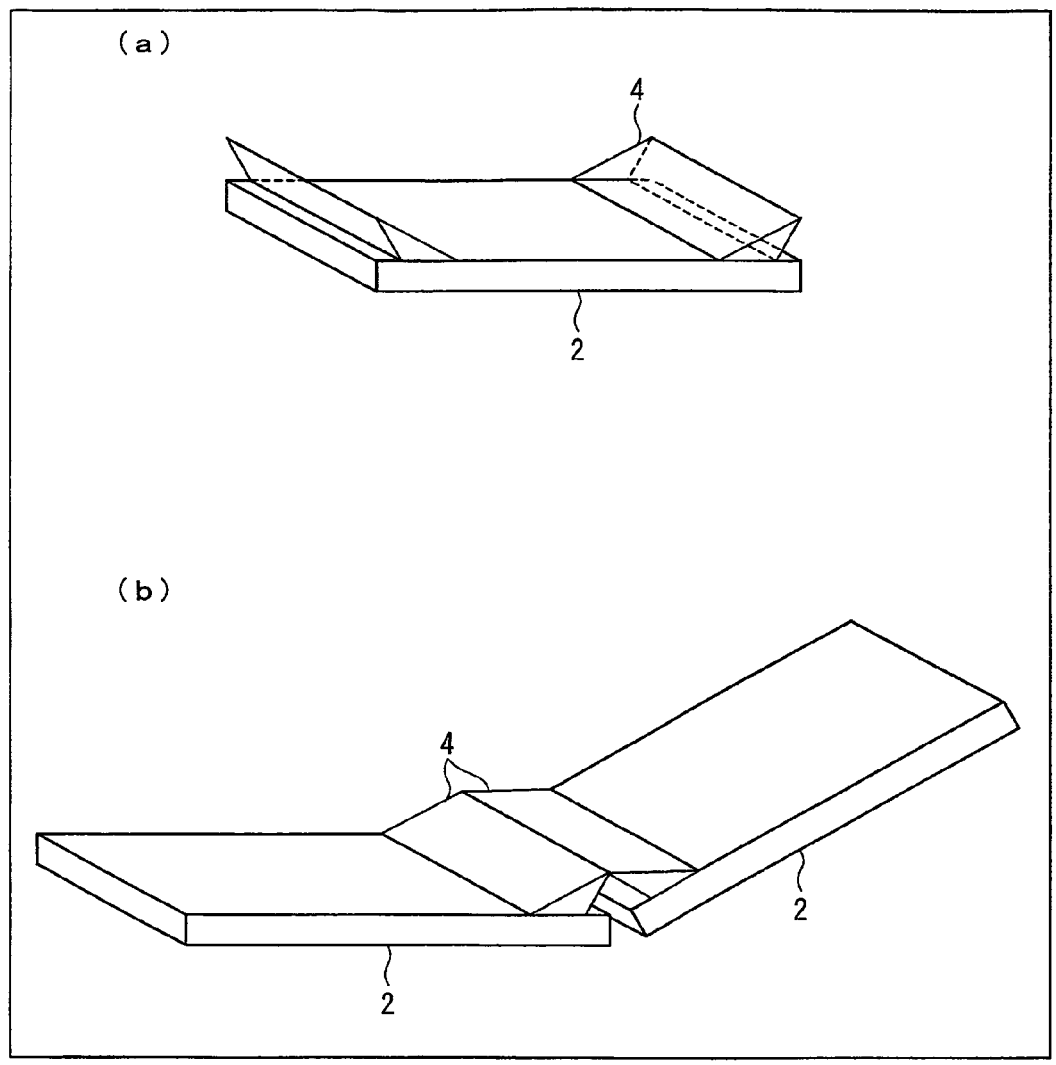
FIG. 2 is a perspective view schematically illustrating a liquid crystal display device which employs the arrangement of the liquid crystal display device shown in FIG. 1, (a) of FIG. 2 shows a case where a single liquid crystal display panel is used, and (b) of FIG. 2 shows a case where two liquid crystal display panels are combined.

FIG. 2 is a perspective view illustrating an outline arrangement of a liquid crystal display device (display device) of the present embodiment. Each of the liquid crystal display devices shown in (a) and (b) of FIG. 2 includes a liquid crystal display panel(s) 2 and light guide elements 4. The liquid crystal display device shown in (a) of FIG. 2 includes a liquid crystal display panel 2 having a rectangular shape and two light guide elements 4 provided on the liquid crystal display panel 2 so as to be located in right and left peripheral areas facing each other out of peripheral areas of the liquid crystal display panel 2. Meanwhile, the liquid crystal display device shown in (b) of FIG. 2 includes two liquid crystal display device 2 provided so that their ends are in proximity with each other, and light guide elements 4 provided on the respective liquid crystal display devices 2 so as to be in contact with each other with no gap therebetween.

The liquid crystal display panels 2 are connected to each other by a movable mechanism (e.g., hinge or the like) (not shown) so that a relative angle between display surfaces of the liquid crystal display panels 2 can be changed. Note that such a movable mechanism is an example, and can be omitted. For example, it is also possible that the two liquid crystal display panels are fixed so that their ends are in contact with each other. Moreover, the number of liquid crystal display panels is not limited to two, and three or more liquid crystal display panels may be connected to each other.

Each of the liquid crystal display panels 2 has (i) a display area in which a plurality of display elements (not shown) for displaying an image are disposed in a matrix and (ii) an area (hereinafter referred to as "frame area") around the display area. No display element is disposed in the frame area, and therefore an image cannot be displayed in the frame area.

Each of the light guide elements 4 is, for example, a fiber (face)plate, and has a function of changing a light path of part of light emitted from the display elements so that the part of light is guided to the frame area, i.e., a function of changing the display area (display surface) of the liquid crystal display panel 2.

The fiber plate has a shape of a bundle of fibers each having a diameter of several μm. Each of the fibers is constituted by core glass for transferring light, clad glass that covers the core glass and that has a refractive index different from that of the core glass, and an absorber that absorbs light leaked from the core glass. Since each of the fibers can transfer light without interfering with the other fibers, an image given to a light incident surface of the fiber plate (which is a light incident surface common to all the fibers) is obtained from a light exit surface as it is.

Accordingly, in the arrangement of (a) of FIG. 2, a light path of part of an image displayed on the liquid crystal display panel 2 is changed by the light guide elements 4 each of which is such a fiber plate, so that an image can be displayed also in the frame area. Further, in the arrangement of (b) of FIG. 2, a light path is changed in a similar manner by the light guide elements 4, so that an image without seams or joins (seamless image) can be displayed. This is described below in detail.

Generally, a liquid crystal display panel has, on its periphery, a frame area in which display cannot be carried out. The frame area is provided as a clearance necessary at a manufacturing stage. Specifically, a substrate constituting a liquid crystal panel is produced by cutting a single original substrate into a plurality of substrates. Accordingly, the frame area is necessary as a clearance at which substrates are cut away from each other.

Further, the frame area is used as an area to which a sealing agent for sealing liquid crystal is applied and as an area where signal wiring, preliminary wiring, test wiring, connection wiring or a connection terminal connected to an external circuit is provided.

Accordingly, since the liquid crystal display panel 2 has such a frame area, an image cannot be displayed in the frame area, and even in a case where a large-sized display screen is obtained by disposing a plurality of liquid crystal display panels so that their ends are in contact with each other, an image that is seamless on the whole cannot be displayed on the display screen.

Figure 3:
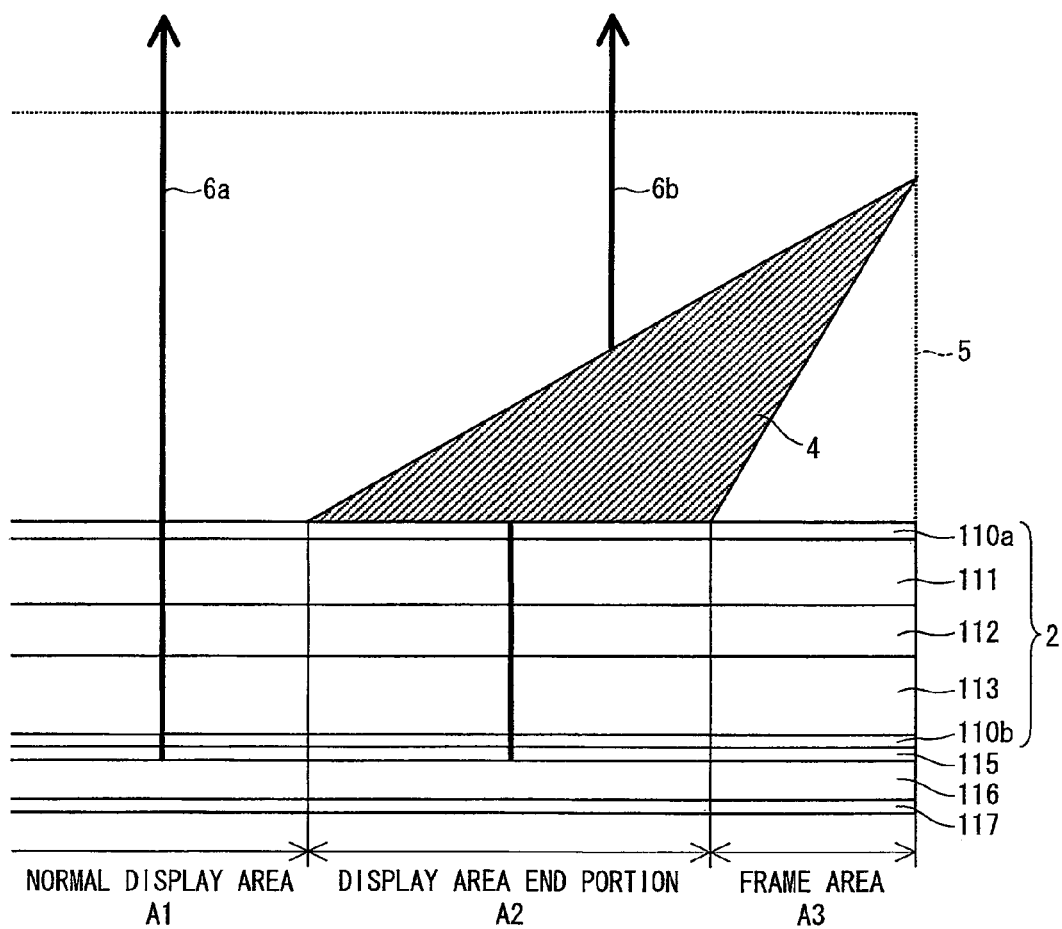
FIG. 3 is a partial cross-sectional view illustrating a structure of a liquid crystal display panel and a light guide element of Embodiment 1 of the present invention.

In view of this, each of the light guide elements 4 is provided on an area A2 (hereinafter referred to as a display area end portion) in the vicinity of an edge of the liquid crystal display panel 2 so as to be located above a frame area A3 outside the display area, as shown in FIG. 3. This allows a light path of light emitted from the display area end portion A2 to be changed so that the light is guided to the frame area A3. Thus, an image of the display area end portion A2 is displayed on the frame area A3. Consequently, a seamless image can be displayed. The following describes structures of such liquid crystal display panel 2 and light guide element 4 with reference to FIG. 3.

FIG. 3 is a partial cross-sectional view illustrating a structure of the liquid crystal display panel 2 and the light guide element 4. In FIG. 3, courses (light paths) 6a and 6b of light emitted from the liquid crystal display panel 2 (practically, emitted from a light guide plate 116 in a later-described backlight device) are exemplified by the thick arrows. A transparent cover 5 that is shown in FIG. 3, but is not shown in FIG. 2 protects the liquid crystal display panel 2 and the light guide element 4.

FIG. 3 is a cross-sectional view of the liquid crystal display panel 2 and the light guide element 4 taken along a longitudinal direction (right-to-left direction of FIG. 2) of the liquid crystal display panel shown in FIG. 2, which cross-sectional view mainly illustrates the vicinity of the light guide element 4 in close-up.

The light guide element 4, which is a fiber plate, has a bottom surface which light from the liquid crystal display panel 2 enters (i.e., light incident surface of all the fibers constituting the fiber plate). The bottom surface of the light guide element 4 is bonded to the display area end portion A2 of the liquid crystal display panel 2. Further, the light guide element 4 has an upper slanted surface from which the light from the liquid crystal display panel 2 exits (i.e., light exit surface of all the fibers). The upper slanted surface of the light guide element 4 covers (leans over) a range from the display area end portion A2 to the frame area A3 of the liquid crystal display panel 2.

Accordingly, a light path of light that is emitted from the display area end portion A2 of the liquid crystal display panel 2 and then enters the light guide element 4 is changed by the light guide element 4 so that the light is emitted also towards an area above the frame area A3. As a result, an image is displayed as if the frame area A3 in which no image can be displayed does not exist.

Various kinds of display are carried out on the liquid crystal display panel 2 by controlling, for each pixel, a transmission amount of light emitted from a light source, such as an LED (Light Emitting Diode) (not shown), which is included in the backlight device. Accordingly, the liquid crystal display panel 2 includes: a TFT (Thin Film Transistor) substrate 111, a CF (Color filter) substrate 113, and a liquid crystal layer 112 sandwiched by these substrates. On a top surface of the TFT substrate 111, a polarization plate 110a is bonded. On a bottom surface of the CF substrate 113, a polarization plate 110b is bonded.

The backlight device is provided so that its top surface is in contact with a bottom surface of the liquid crystal display panel 2. The light source (not shown) is provided in an end part of the backlight device. The backlight device includes: the light guide plate 116 which causes light from the light source to be emitted from an illumination surface in a form of plane emission; a lens sheet etc. 115 including a lens sheet, a light diffusion sheet, etc. which are disposed on a top surface (illumination surface) of the light guide plate 116; and a reflecting sheet 117 bonded to a bottom surface (a surface opposite to the illumination surface) of the light guide plate 116.

Light emitted from the light source of the backlight device enters a predetermined light incident surface of the light guide plate 116, and then spreads throughout the light guide plate 116. Thus, the light is emitted from the illumination surface (light-emitting surface) of the lens sheet etc. 115 in a form of plane emission. Out of the light thus emitted, light emitted from the display area end portion A2 of the liquid crystal display panel 2 passes through the light guide element 4, and light emitted from the display area (hereinafter referred to as "normal display area") A1 other than the display area end portion A2 is emitted towards an outside the device without passing through the light guide element 4, so that a displayed image is formed.

The following describes an overall arrangement and operation of a liquid crystal display device for forming such a displayed image.

Figure 4:
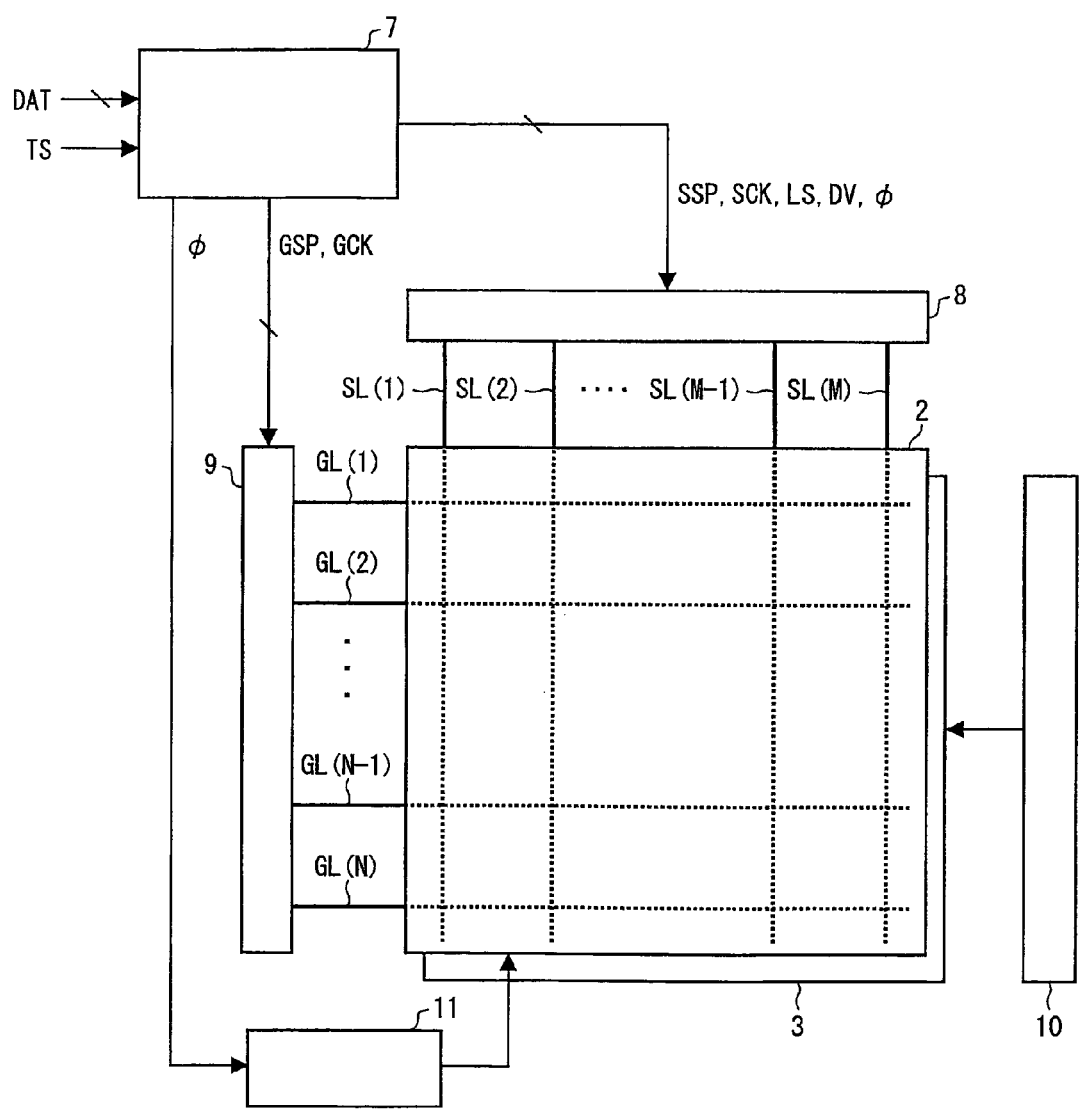
FIG. 4 is a block diagram illustrating an overall arrangement of an active matrix type liquid crystal display device constituted by the liquid crystal display panel and various driving sections.

FIG. 4 is a block diagram illustrating an overall arrangement of an active matrix type liquid crystal display device of Embodiment 1 of the present invention. The liquid crystal display device includes: a driving control section constituted by a display, control circuit 7, a video signal line driving circuit (source driver) 8, a scanning signal line driving circuit (gate driver) 9, and a common electrode driving circuit 11; the liquid crystal display panel 2, and a backlight section constituted by a backlight device 3 and a backlight driving circuit 10.

The display control circuit 7 and the video signal line driving circuit 8 are often realized by separate large scale integration circuit (hereinafter referred to as "LSI") chips. In the present embodiment, however, the display control circuit 7 and the video signal line driving circuit 8 are realized by a single LSI chip (source driver with a built-in RAM). Alternatively, a driving control circuit including the display control circuit 7, the video signal line driving circuit 8, and the scanning signal line driving circuit 9 may be realized by a single LSI chip or may be monolithically formed on a glass substrate of the liquid crystal panel.

A display section of the liquid crystal display panel 2 shown in FIG. 4 includes a plurality of (M) video signal lines SL(1) through SL(M), a plurality of (N) scanning signal lines GL(1) through GL(N), and a plurality of (M×N) pixel formation sections (corresponding to the display elements) (not shown) provided corresponding to intersections between the plurality of video signal lines and the plurality of scanning signal lines.

Each of the pixel formation sections is constituted by (i) a TFT (Thin Film Transistor) (not shown) which is a switching element whose gate terminal is connected to a scanning signal line GL(n) passing through a corresponding intersection and whose source terminal is connected to a video signal line SL(m) passing through the corresponding intersection, (ii) a pixel electrode (not shown) connected to a drain terminal of the TFT, (iii) a common electrode (also referred to as "counter electrode") (not shown) shared by the plurality of pixel formation sections, and (iv) a liquid crystal layer serving as an electro-optic device sandwiched between the pixel electrode and the common electrode.

Each of the pixel formation sections includes R (red), G (green), and B (blue) pixel formation sections, and R, G, and B pixels formed by these pixel formation sections are combined to form a single color pixel. The colors are not limited to the three colors: R, G, and B, and any colors selected from six colors of R (red), G (green), B (bleu), Y (yellow), C (cyan), and M (magenta)) may be used. A driving mode used in the present embodiment is line inversion driving in which a polarity of a voltage applied to the liquid crystal layer of the pixel formation sections is inverted every line of the display section and is inverted every frame.

The display control circuit 7 receives an image signal DAT and a timing control signal TS that are externally supplied, and outputs a digital image signal DV, and a source start pulse signal SSP, a source clock signal SCK, a latch strobe signal LS, a gate start pulse signal GSP, a gate clock signal GCK, and a polarity inversion signal φ, each of which is for controlling timing at which an image is displayed on the display section. The display control circuit 7 carries out, with respect to the image signal DAT thus received, appropriate correction (gamma correction etc.) for compensating a difference in display characteristic (gamma characteristic etc.) between the normal display area A1 and the display area end portion A2, and then outputs the image signal DAT as the digital image signal DV (corrected image signal). This operation and the arrangement are described later in detail.

The video signal line driving circuit 8 receives, from the display control circuit 7, the digital image signal DV, the source start pulse signal SSP, the source clock signal SCK, and the latch strobe signal LS, and supplies a driving video signal to each of the video signal lines SL(1) through SL(M) so as to charge a pixel capacitor of each of the pixel formation sections within the display section. In the video signal line driving circuit 8, digital image signals DV indicative of voltages to be applied to the video signal lines SL(1) through SL(M) are sequentially kept at timings when pulses of source clock signals SCK are generated.

Then, the digital image signals DV thus kept are converted into analog voltages at timings when pulses of latch strobe signals LS are generated. The analog signals thus obtained are simultaneously applied, as the driving video signals, to all of the video signal lines SL(1) through SL(M). That is, in the present embodiment, line sequential driving is adopted as a driving mode for driving the video signal lines SL(1) through SL(M). Note that a polarity of a video signal applied to each of the video signal lines SL(1) through SL(M) is inverted for AC driving of the display section in response to the polarity inversion signal φ.

The scanning signal line driving circuit 9 sequentially supplies active scanning signals to the scanning signal lines GL(1) through GL(N) in response to the gate start pulse signal GSP and the gate clock signals GCK supplied from the display control circuit 7.

The common electrode driving circuit 11 generates a common electrode Vcom that is a voltage to be applied to the common electrode of the liquid crystals. In the present embodiment, it is assumed that an electric potential of the common electrode is also changed in accordance with the AC driving so as to reduce an amplitude of a voltage applied to a video signal line. The common electrode driving circuit may be provided in the display control circuit 7 or in the scanning signal line driving circuit 9.

The driving video signals are thus applied to the video signal lines SL(1) through SL(M), and the scanning signals are thus applied to the scanning signal lines GL(1) through GL(N). This controls light transmittance of the liquid crystal layer. Thus, an image is displayed on the display section of the liquid crystal display panel 2.

Figure 5:
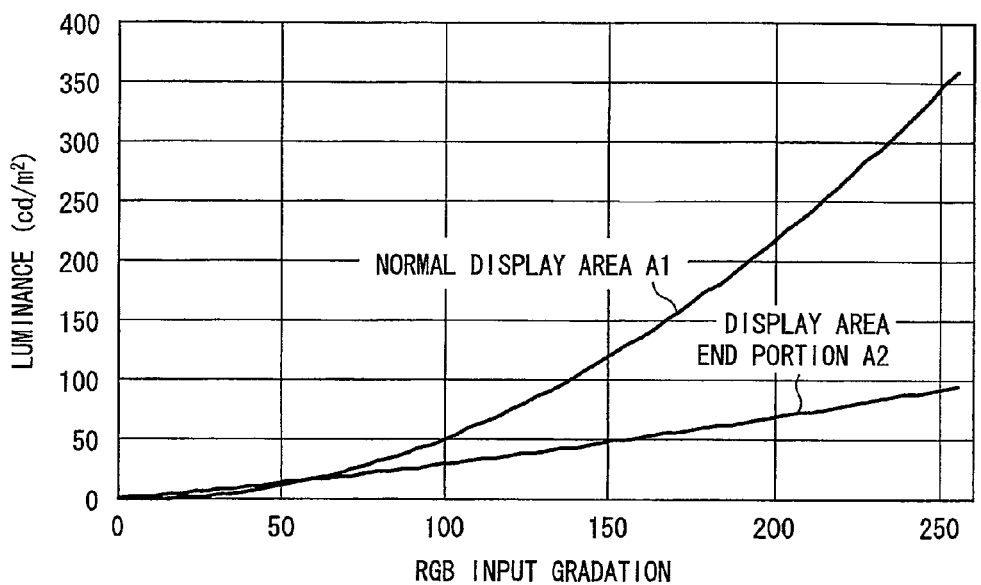
FIG. 5 is a graph showing gradation-luminance characteristics of the liquid crystal display device in a normal display area and a display area end portion which are obtained in a case where the present invention is not used.

FIG. 5 is a graph comparing (i) luminance (hereinafter referred to as surface luminance) of the liquid crystal display device per unit area in the normal display area A1 and (ii) surface luminance of the liquid crystal display device in an area in which a light path length of a fiber is largest out of the display area end portion A2. In FIG. 5, transmittance of the liquid crystal display panel is 7%, transmittance of the light guide element in the area in which the light path length of the fiber is largest is 30%, surface luminance of the light-emitting surface of the backlight is 5200 cd/m$^2$ both in the normal display area A1 and the display area end portion A2, and surface luminance of the liquid crystal display device in the normal display area A1 is 360 cd/m$^2$ at maximum gradation.

FIG. 5 shows that the surface luminance of the liquid crystal display device in the area in which the light path length of the fiber is largest out of the display area end portion A2 is attenuated to about 30% of the surface luminance of the liquid crystal display device in the normal display area A1.

Thus, a reduction in luminance occurs in the area where the light guide element is provided. In addition, there is a variation in degree of the luminance reduction among R, G, and B. This causes a color shift etc. Consequently, a border between the area where the light guide element is provided and the area where the light guide element is not provided is clearly observed by a viewer, thereby giving the viewer a sense of strangeness. That is, in the liquid crystal display device in (a) of FIG. 2, the frame area is clearly observed, and in the liquid crystal display device in (b) of FIG. 2, the display panels cannot be perceived as a single display panel by a viewer, i.e., a sense of strangeness is given to the viewer since a border between the display panels is clearly observed.

One solution to such a problem is to control the transmittance of the liquid crystal display panel so as to correct image signals supplied to display elements in the normal display area A1. For example, luminance at each gradation is reduced in the normal display area A1 so that a gamma characteristic in the normal display area A1 matches that in the display area end portion A2. To put it simply, it is impossible to increase the maximum luminance of the display area end portion A2 which is inevitably lower than the maximum luminance of the normal display area A1. Accordingly, it is impossible to adjust the gamma characteristic in the display area end portion A2 to the gamma characteristic of the normal display area A1. This necessitates adjusting the surface luminance of the liquid crystal display device in the normal display area A1 to the reduced surface luminance of the liquid crystal display device in the display area end portion A2. This greatly damages original display characteristics of the liquid crystal display device.

In view of this, luminance per unit area on the light emitting surface of the backlight device 3, i.e., on the illumination surface of the lens sheet etc. 115 is made larger in the display area end portion A2 in which the light guide element 4 is provided than in the normal display area A1 in which the light guide element 4 is not provided.

Specifically, this may be accomplished by (i) a method of adjusting, for example, driving currents for the light sources so that luminance of light sources for illuminating the display area end portion A2 becomes higher than luminance of light sources for illuminating the normal display area A1 or (ii) a method of using, as light sources for the display area end portion A2, light sources having higher light-emitting performance than the light sources for illuminating the normal display area A1. The present embodiment deals with a case where the number of light sources for the normal display area A1 and the number of light sources for the display area end portion A2 are adjusted. This is described below.

Figure 1:
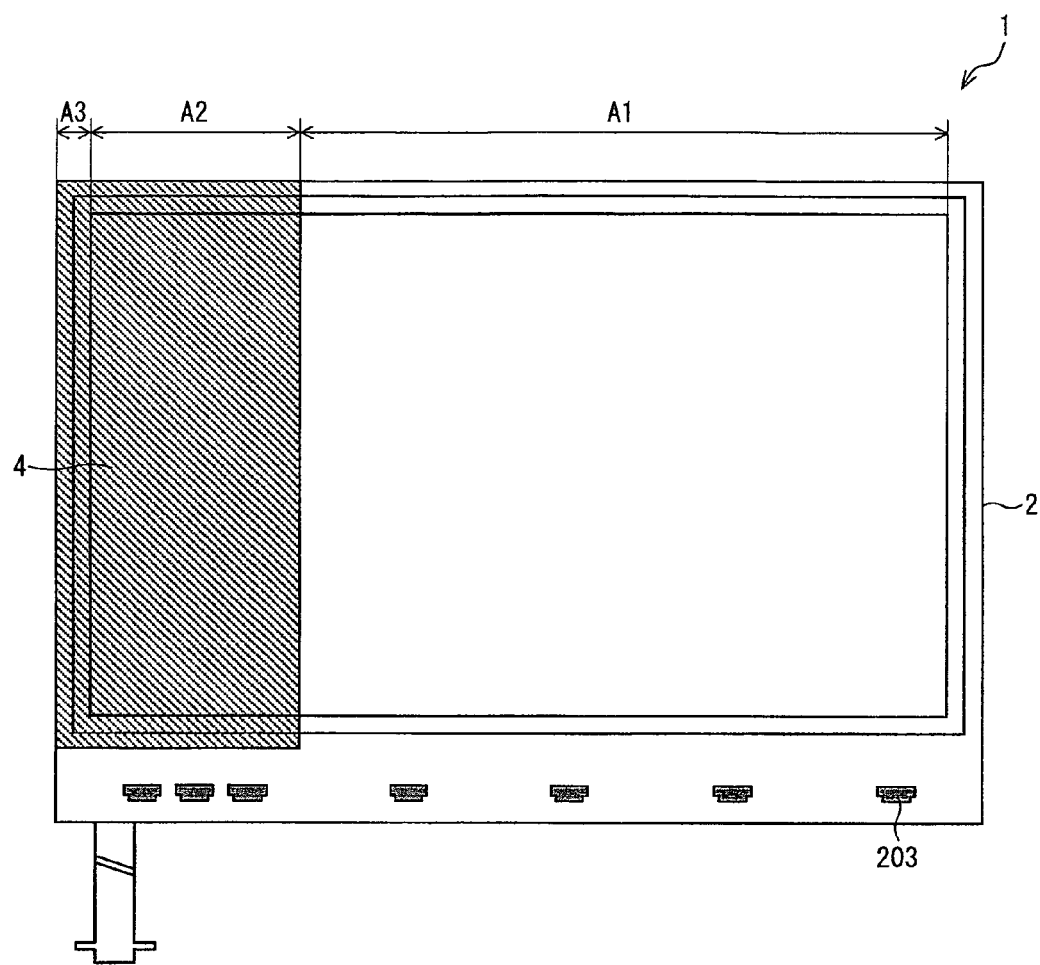
FIG. 1 is a plan view schematically illustrating a principle arrangement of a liquid crystal display device of Embodiment 1 of the present invention.

As illustrated in FIG. 1 which is a plan view illustrating the liquid crystal display device, a plurality of LEDs 203 are provided in the backlight device 3 as light sources. The LEDs 203 are provided on a surface B so that the number of LEDs 203 corresponding to the display area end portion A2 per unit area is larger than the number of LEDs 203 corresponding to the normal display area A1 per unit area.

This allows the surface luminance of the light-emitting surface of the backlight device 3 to be made larger in the display area end portion A2 than in the normal display area A1, thereby suppressing a reduction in luminance of the liquid crystal display device in the display area end portion A2. As a result, it is possible to reduce a difference in luminance of the display device between the area where the light guide element is provided and the area where the light guide element is not provided. This produces an effect that a sense of strangeness is not given to a viewer.

The present embodiment has dealt with a case where the number of LEDs corresponding to the display area end portion A2 per unit area is increased. Alternatively, it is also possible that the maximum luminance per LED is increased. The backlight may be an edge light type backlight or a direct backlight. The light sources are not limited to LEDs.

FIG. 9 shows characteristic of output luminance to input gradation (gamma characteristics) obtained before image signal correction in the normal display area A1 and the display area end portion A2, and a gamma characteristic obtained after the image signal correction in both these areas. In FIG. 9, the surface luminance of the light-emitting surface of the backlight in the normal display area A1 is 5200 cd/m$^2$, and the surface luminance of the light-emitting surface of the backlight in the display area end portion A2 is 17300 cd/m$^2$.

Since the surface luminance of the light-emitting surface of the backlight in the display area end portion A2 is larger than that in the normal display area A1, the output luminance of the display area end portion A2 is higher than that of the normal display area A1 throughout the whole range of input gradations.

Note that it is preferable that the surface luminance of the light-emitting surface of the backlight in the display area end portion A2 is adjusted so that luminance at the maximum gradation (maximum gradation luminance) in the display area end portion A2 becomes equal to that in the normal display area A1. This is because by making the maximum gradation luminance in the display area end portion A2 equal to that in the normal display area A1, a difference in luminance between these areas can be reduced. Note that a method for adjusting the surface luminance is not limited to the above method. The details are described below.

The maximum gradation luminance is maximum luminance of the liquid crystal display device per unit area that is obtained at the maximum gradation in the normal display area A1 and the display area end portion A2.

As is clear from a comparison between the gamma characteristic in the normal display area A1 and the gamma characteristic in the display area end portion A2 which are obtained before the image signal correction, luminance in the normal display area A1 and luminance in the display area end portion A2 are almost equal to each other at the maximum gradation, but largely differ from each other at the other gradations. Accordingly, it is necessary to carry out gamma correction of the image signal DAT.

The easiest way to carry out the gamma correction is to carry out the gamma correction with respect to all of the plural types of elements emitting different colors in a single uniform way, regardless of color. For example, FIG. 10 shows a look-up table (hereinafter referred to as LUT) 2 for the gamma correction carried out with respect to the normal display area A1 in accordance with the gamma correction curve shown in FIG. 9, and a LUT 1 for the gamma correction carried out with respect to the display area end portion A2 in accordance with the gamma correction curve shown in FIG. 9. In a case where the gamma correction is carried out in a single uniform way regardless of color, an output gradation, for example, for the input gradation 255 is set to 255 in the normal display area A1 and to 250 in the display area end portion A2 regardless of color. Further, an output gradation for the input gradation 11 is set to 37 in the normal display area A1 and to 5 in the display area end portion A2 regardless of color.

This makes it possible to easily reduce a difference in luminance between the area where the light guide element is provided and the area where the light guide element is not provided, in a case where achromatic display in which every color is displayed at the same gradation is carried out. That is, it is unnecessary to prepare an LUT for each color. Accordingly, it is possible to simplify an arrangement for carrying out the gamma correction and to reduce a storage area for LUTs.

It is also possible to employ a method of carrying out the same gamma correction with respect to all the colors, and then carrying out further gamma correction only with respect to an image signal for a color suffering from a large color shift. For example, in a case where a fiber plate used as the light guide element 4 in the present embodiment has a property of shifting transmitted light to yellow, only a blue image signal is corrected so that luminance of blue is increased.

To more accurately carry out the gamma correction, it is preferable that gamma corrections for R, G, and B are carried out independently from each other. In this case, the gamma correction may be carried out only with respect to an image signal for a color suffering from a large color shift. Alternatively, the gamma correction may be carried out with respect to all of R, G, and B in accordance with gamma characteristics of the colors. This is the most preferable way to improve accuracy.

Figure 6:
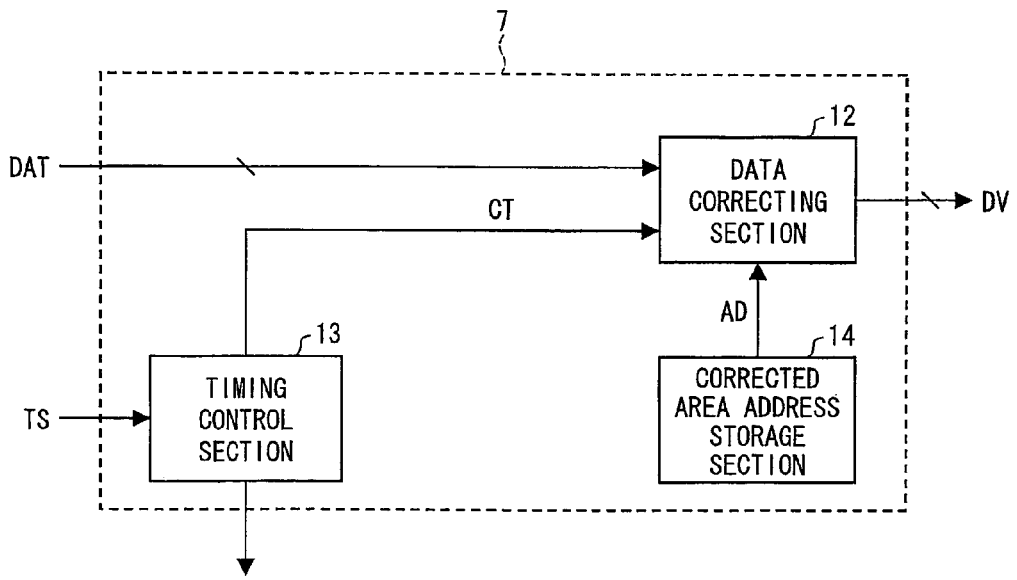
FIG. 6 is a block diagram illustrating an arrangement of a display control circuit shown in FIG. 4.

The following deals with an arrangement and operation of the display control circuit 7. FIG. 6 is a block diagram illustrating the arrangement of the display control circuit 7 of the present embodiment. The display control circuit 7 includes a timing control section 13, a corrected area address storage section 14, and a data correcting section 12 (image signal correcting section). The timing control section 13 controls timings at which signals are transferred between the sections constituting the liquid crystal display device. The corrected area address storage section 14 stores a corrected area address AD (later described) as information specifying positions of the display elements disposed in the display area end portion A2 out of the display elements disposed in a matrix. The data correcting section 12 (a) receives a pixel value (display gradation data) contained in an image signal DAT, (b) compares positional information, on the display area, of a display element to which the pixel value is to be given with the corrected area address AD stored in the corrected area address storage section 14 so as to specify the display element belonging to the display area end portion A2, and (c) corrects the pixel value given to the display element thus specified.

The timing control section 13 shown in FIG. 6 receives a timing control signal TS that is externally supplied, and outputs a control signal CT for controlling operation of the data correcting section 12, and a source start pulse signal SSP, a source clock signal SCK, a latch strobe signal LS, a gate start pulse signal GSP, a gate clock signal GCK, and a polarity inversion signal ϕ each for controlling timing at which an image is displayed on the display section of the liquid crystal display panel 2.

Out of addresses on each RAM for RGB (later described) included in the data correcting section 12, the corrected area address storage section 14 stores addresses (corrected area addresses AD) of a plurality of memory cells in which pixel values to be given to the display elements disposed in the display area end portion A2 are stored, as an example of information for specifying positions of the display elements to which image signals to be corrected are supplied out of the display elements disposed in a matrix.

Note that the information for specifying the positions of the display elements to be corrected is not limited to an address on the RAM. In other words, it is only necessary that the positions of the display elements disposed in a matrix be specified. Accordingly, it is also possible that a two-dimensional coordinate system be applied to the matrix so that the positions of the display elements can be specified by x and y coordinates.

The data correcting section 12 receives a pixel value (display gradation data) contained in the image signal DAT, causes the pixel value to be (temporarily) stored in the RAM (later described), and memorizes an address of a memory cell in the RAM in which the pixel value is stored. Then, the data correcting section 12 sequentially reads out pixel values stored in the RAM in response to the control signal CT from the timing control section 13. In a case where an address of a pixel value thus read out matches any of the corrected area addresses AD stored in the corrected area address storage section 14, the data correcting section 12 corrects the pixel value. Alternatively, the data correcting section 12 corrects at least one of (i) a pixel value whose address matches any of the corrected area addresses AD and (ii) a pixel value whose address does not match any of the corrected area addresses AD.

That is, the data correcting section 12 carries out gamma correction with respect to at least one of (i) image signals to be given to the display elements in the display area end portion A2 and (ii) image signals to be given to the display elements in the normal display area A1 out of the image signals DAT so that the gamma characteristic in the display area end portion A2 where the light guide element 4 is provided approaches that in the normal display area A1 where the light guide element 4 is not provided. Then, the data correcting section 12 outputs a result thus obtained as a digital image signal DV. The following describes, in detail, arrangement and operation of the data correcting section 12 with reference to FIG. 7.

Figure 7:
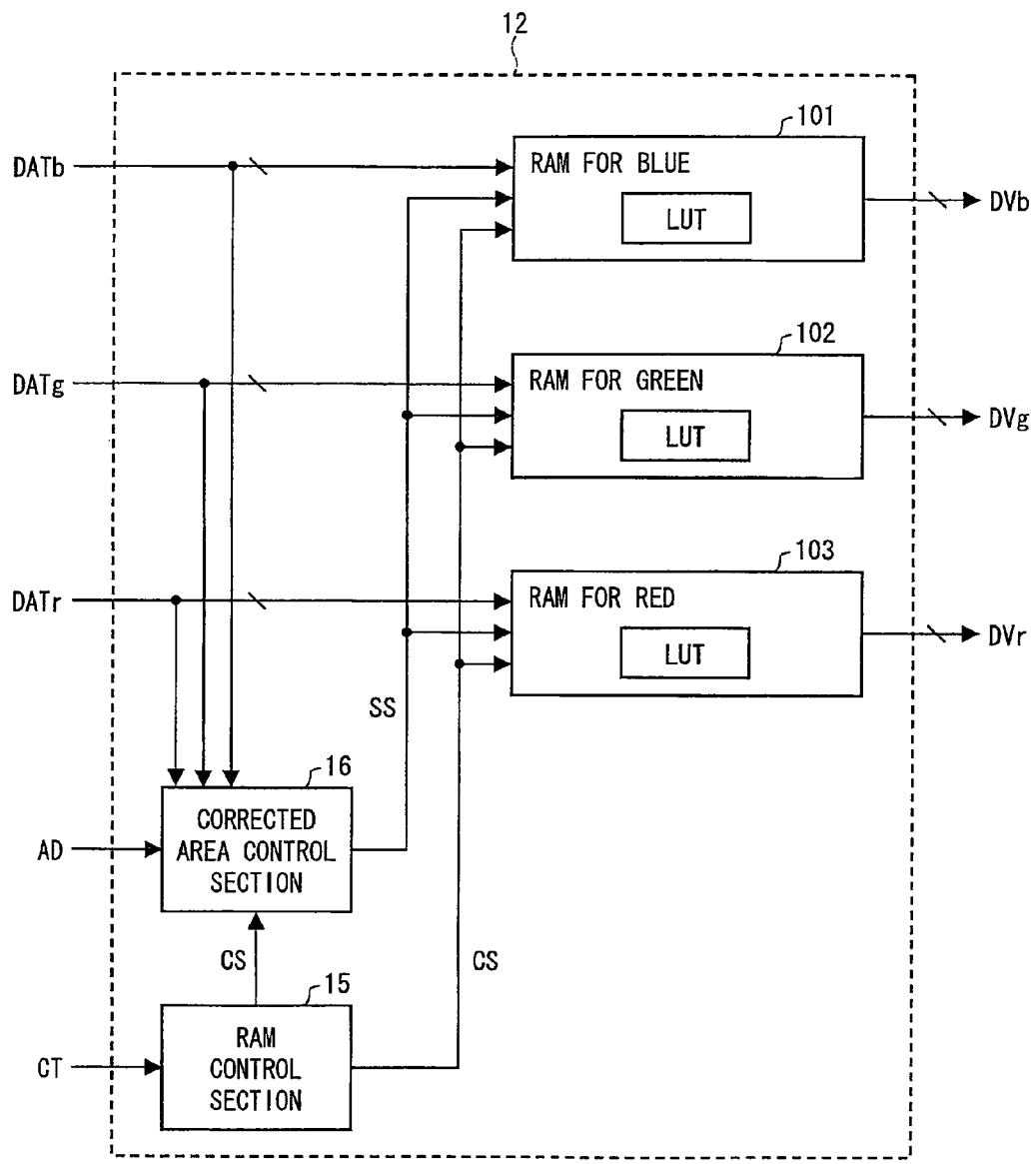
FIG. 7 is a block diagram illustrating an arrangement of a data correcting section shown in FIG. 6.

FIG. 7 is a block diagram illustrating an arrangement of the data correcting section 12 included in the display control circuit 7 of the present embodiment. The data correcting section 12 includes a RAM 101 for blue, a RAM 102 for green, a RAM 103 for red, a RAM control section 15, and a corrected area control section 16. In the RAM 101 for blue, an LUT for correction of display data DATb for blue pixels disposed in the display area end portion A2 is stored. In the RAM 102 for green, an LUT for correction of display data DATg for green pixels disposed in the display area end portion A2 is stored. In the RAM 103 for red, an LUT for correction of display data DATr for red pixels disposed in the display area end portion A2 is stored. The RAM control section 15 controls the RAM 101 for blue, the RAM 102 for green, and the RAM 103 for red (hereinafter collectively referred to as "RAMs for RGB"). The corrected area control section 16 gives an instruction to correct pixel values of pixels disposed in the display area end portion A2.

Although the present embodiment deals with a case where the LUTs are used, it is also possible that no LUT is used. For example, it is also possible that calculation of multiplying pixel values contained in the image signals DAT by a correction coefficient be performed. The RAMs for RGB are realized by three semiconductor chips. Alternatively, the RAMs for RGB may be three different storage areas in a single semiconductor chip or part of a semiconductor memory or the like constituting the corrected area address storage section 14.

The RAM control section 15 outputs a RAM control signal CS in response to the control signal CT supplied from the timing control section 13. The RAM control signal CS contains, for example, addresses of memory cells in the RAM 101 for blue in which memory cells the pixel values contained in the display data DATb for the blue pixels are sequentially stored, and a read address for designating an appropriate LUT out of the LUTs stored in the RAMs for RGB.

The corrected area control section 16 receives the RAM control signal CS from the RAM control section 15, and acquires, from the RAM control signal CS, an address of a memory cell corresponding to a pixel value that is being written into the RAMs for RGB. Then, the corrected area control section 16 compares the address of the memory cell thus acquired with a corrected area address AD read out from the corrected area address storage section 14. In a case where the address of the memory cell thus acquired matches the corrected area address AD, the corrected area control section 16 reads out a pixel value from the memory cell having this address, and gives the RAMs for RGB a correction instruction signal SS for instructing the RAMs for RGB to supply the pixel value thus read out to an LUT designated by the RAM control section 15.

Figure 8:
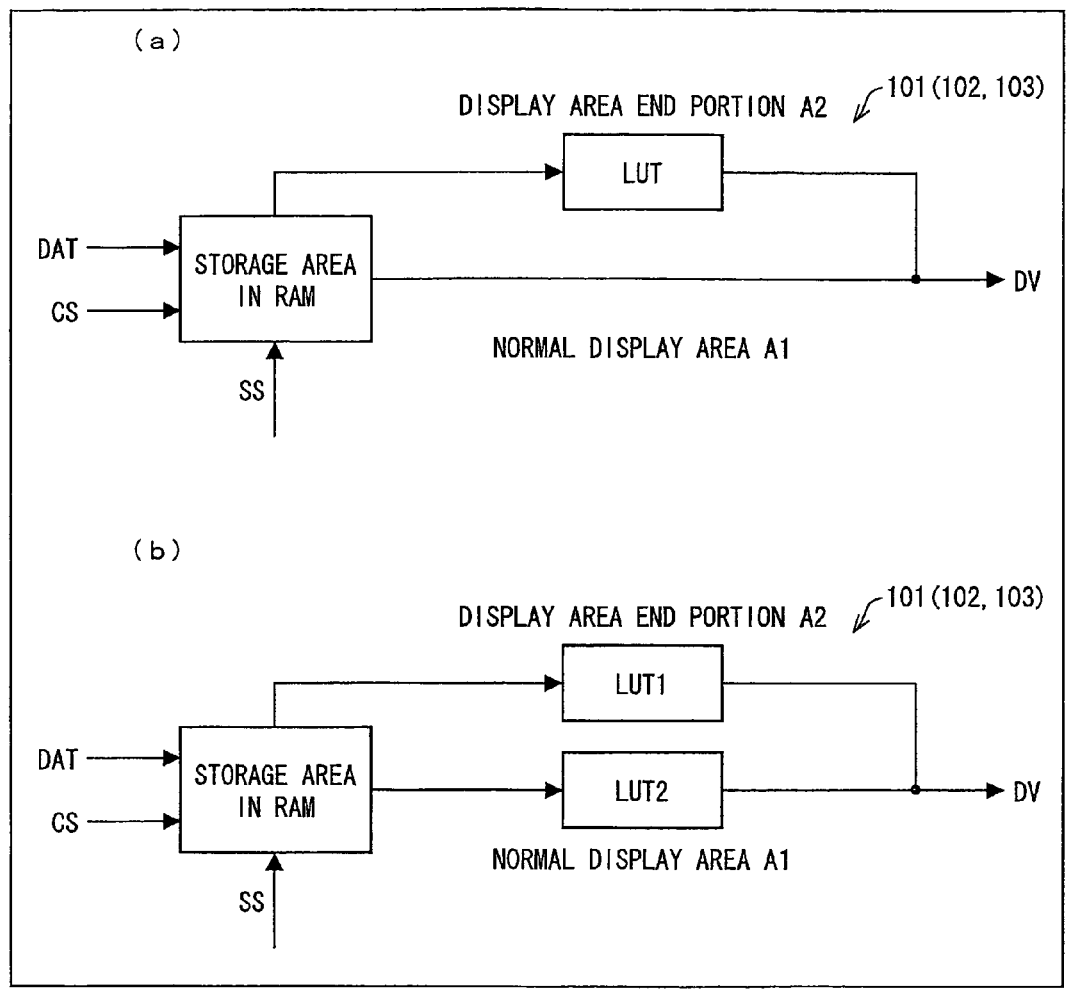
FIG. 8 is a diagram schematically illustrating an internal arrangement of a RAM for RGB shown in FIG. 7, (a) of FIG. 8 shows one exemplary arrangement, and (b) of FIG. 8 shows another exemplary arrangement.

FIG. 8 shows two simple examples of an internal arrangement of the RAMs for RGB. (a) of FIG. 8 shows a case where each of the RAMs for RGB includes only an LUT corresponding to the display area end portion A2, and (b) of FIG. 8 shows a case where each of the RAMs for RGB includes both of an LUT corresponding to the normal display area A1 and an LUT corresponding to the display area end portion A2.

In the case of (a) of FIG. 8, for example in a case where the correction instruction signal SS is supplied to the RAM 101 for blue, the upper route in (a) of FIG. 8 is taken so that an LUT designated by the RAM control signal CS is used. Specifically, a pixel value corresponding to the display area end portion A2 instructed by the RAM control signal CS is read out from a storage area of the RAM 101 for blue, is corrected by the LUT, and is then outputted as a corrected image signal DV.

In a case where the correction instruction signal SS is not supplied to the RAM 101 for blue, the lower route in (a) of FIG. 8 is taken. Specifically, a pixel value corresponding to the normal display area A1 instructed by the RAM control signal CS is read out from the storage area of the RAM 101 for blue, and is then outputted as a corrected image signal DV without being corrected.

In the case of (a) of FIG. 8, a display characteristic of the normal display area A1 is used as a standard. That is, a display characteristic of the display area end portion A2 is adjusted to the display characteristic of the normal display area A1. Further, in this case, it is possible to produce an effect that the number of LUTs is reduced, thereby making a RAM capacity smaller, as compared with the case of (b) of FIG. 8.

Meanwhile, in (b) of FIG. 8, in a case where the correction instruction signal SS is supplied to the RAM 101 for blue, the upper route in (b) of FIG. 8 is taken so that the LUT 1 designated by the RAM control section CS is used. Specifically, a pixel value corresponding to the display area end portion A2 is read out from the storage area of the RAM 101 for blue, is corrected by the LUT 1, and is then outputted as a corrected image signal DV.

In a case where the correction instruction signal SS is not supplied to the RAM 101 for blue, the lower route in (b) of FIG. 8 is taken so that the LUT 2 designated by the RAM control section CS is used. Specifically, a pixel value corresponding to the normal display area A1 is read out from the storage area of the RAM 101 for blue, is corrected by the LUT 2, and is then outputted as a corrected image signal DV.

In the case of (b) of FIG. 8, a display characteristic used as a standard is determined in advance, and each of the display characteristic of the normal display area A1 and the display characteristic of the display area end portion A2 is adjusted to the display characteristic used as a standard. Further, in this case, both of (i) image signals DAT corresponding to the normal display area A1 and (ii) image signals DAT corresponding to the display area end portion A2 can be corrected. This produces an effect that a difference in display characteristic between these areas can be reduced and an effect that an optimum display characteristic can be obtained.

The following describes a method for correcting an image signal. In a case where surface luminance of the liquid crystal display device in the display area end portion A2 at maximum gradation is set to match surface luminance of the liquid crystal display device in the normal display area A1 at maximum gradation, the following two methods can be employed for correction of an image signal.

(1) adjusting a gamma characteristic in an area where a light guide element is provided to a gamma characteristic in which no light guide element is provided.

(2) adjusting, to a standard gamma characteristic, both of (i) a gamma characteristic in an area where a light guide element is provided and (ii) a gamma characteristic in which no light guide element is provided.

FIG. 9 shows a case where gamma characteristics are corrected by the method (2), and FIG. 10 shows an LUT 2 corresponding to the normal display area A1 and an LUT1 corresponding to the display area end portion A2 used in a case where the method (2) is carried out.

As shown in FIGS. 9 and 10, according to the method (2), the standard gamma characteristic is an intermediate characteristic between the gamma characteristic of the display area end portion A2 and the gamma characteristic of the normal display area A1. Accordingly, gamma correction of increasing output luminance is carried out with respect to the normal display area A1, whereas gamma correction of reducing output luminance is carried out with respect to the display area end portion A2.

Meanwhile, in a case where the surface luminance of the liquid crystal display device in the display area end portion A2 at maximum gradation is set so as not to exceed the surface luminance of the liquid crystal display device in the normal display area A1 at maximum gradation, the following two correction methods are possible.

(1) adjusting a gamma characteristic in an area where no light guide element is provided to a gamma characteristic where a light guide element is provided.

(2) adjusting, to a standard gamma characteristic, both of (i) a gamma characteristic in an area where a light guide element is provided and (ii) a gamma characteristic where no light guide element is provided.

The detailed descriptions for this case are omitted.

Embodiment 2

Another embodiment of the present invention is described below with reference to FIGS. 11 through 18. For convenience of description, constituent members having the identical functions to those shown in the drawings of Embodiment 1 are given identical reference numerals, and are not explained repeatedly.

According to Embodiment 1, the following problem occurs in a case where surface luminance of the liquid crystal display device in the display area end portion A2 at maximum gradation is set to match surface luminance of the liquid crystal display device in the normal display area A1 at maximum gradation. Specifically, since backlight luminance in the display area end portion A2 is increased, a black image (gradation 0) for example is brighter in the display area end portion A2 than in the normal display area A1 as shown in FIG. 11. This gives a viewer a sense of strangeness.

For example, FIG. 11 shows that surface luminance of approximately 4 cd/m$^2$ is observed in the display area end portion A2, i.e., grayish black is displayed in the display area end portion A2 during display of a black image (input gradation 0).

This problem may be solved by increasing luminance (setting output gradation to 27 for the input gradation 0) of the normal display area A1 in the vicinity of black image display (in the vicinity of gradation 0) in conformity with the black image display of the display area end portion A2, as in the LUT shown in FIG. 10. However, this causes problems such as (i) a problem that gradations of the normal display area A1 cannot be sufficiently expressed (different gradations have an identical luminance in the LUT 2 of the normal display area A1) since a slope of the gamma characteristic of the display area end portion A2 becomes larger than that of the normal display area A1 at low gradations, and (ii) a problem that black floating occurs.

Note that the black floating is a phenomenon in which grayish black is displayed at the input gradation 0 although black should be displayed.

In order to solve the above problems, in Embodiment 2, backlight luminance is controlled based on plural patterns in accordance with an average gradation of the image signals DAT, and image signals given to the display elements in the display area end portion A2 are corrected based on correction patterns corresponding to the plural patterns. Thus, gamma characteristics etc. in the normal display area A1 and the display area end portion A2 are matched.

Figure 12:
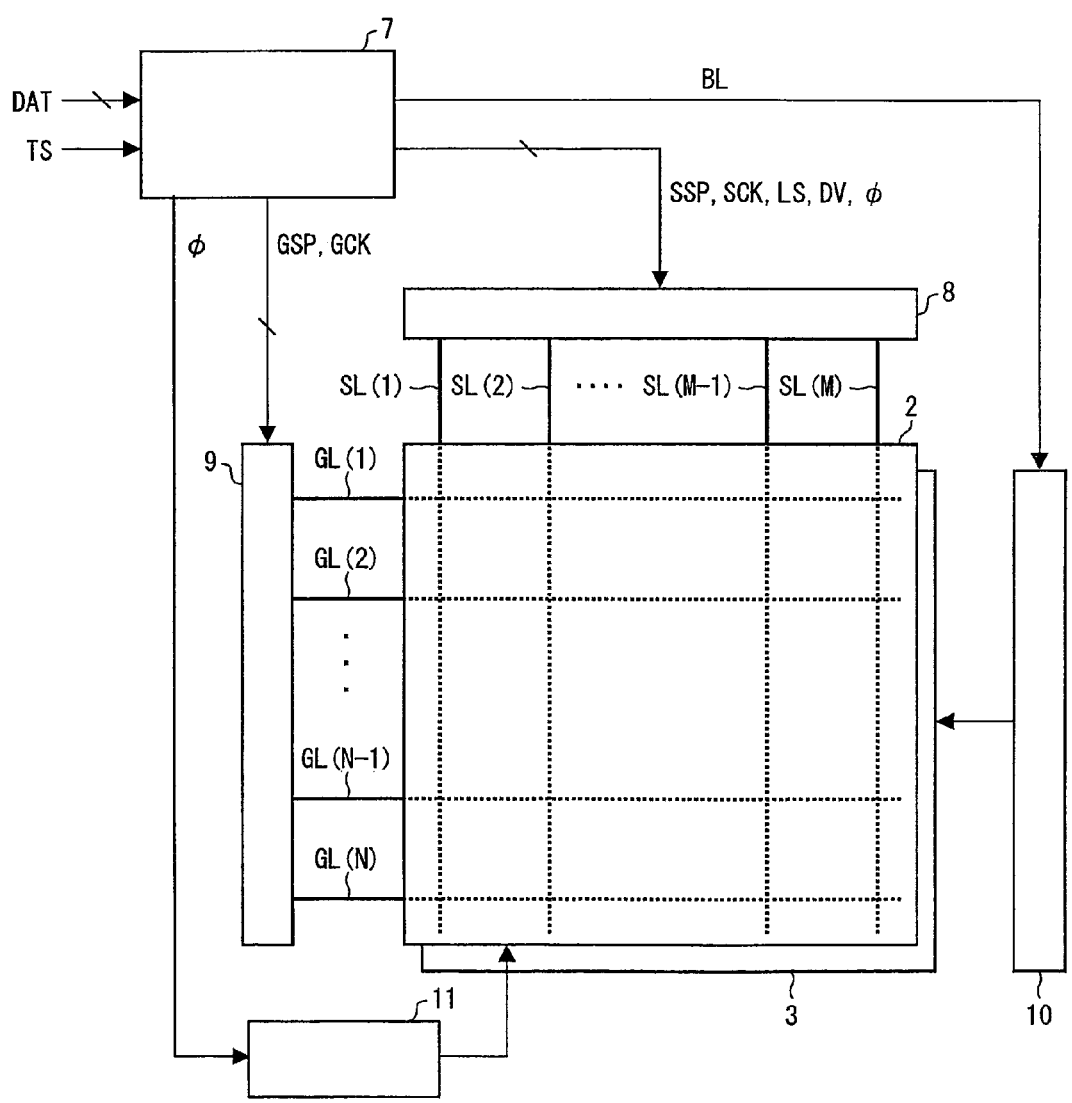
FIG. 12 is a block diagram illustrating an overall arrangement of an active matrix type liquid crystal display device of Embodiment 2 of the present invention.

FIG. 12 is a block diagram illustrating an overall arrangement of an active matrix type liquid crystal display device of Embodiment 2 of the present invention. Embodiment 2 is different from Embodiment 1 in that a backlight driving circuit 10 is configured to drive a backlight in accordance with an average gradation of image signals DAT.

Specifically, the backlight driving circuit 10 receives, from a display control circuit 7, a backlight control signal BL for controlling a driving current for the backlight, and controls a driving current applied to a backlight device 3 in accordance with the backlight control signal BL.

Figure 13:
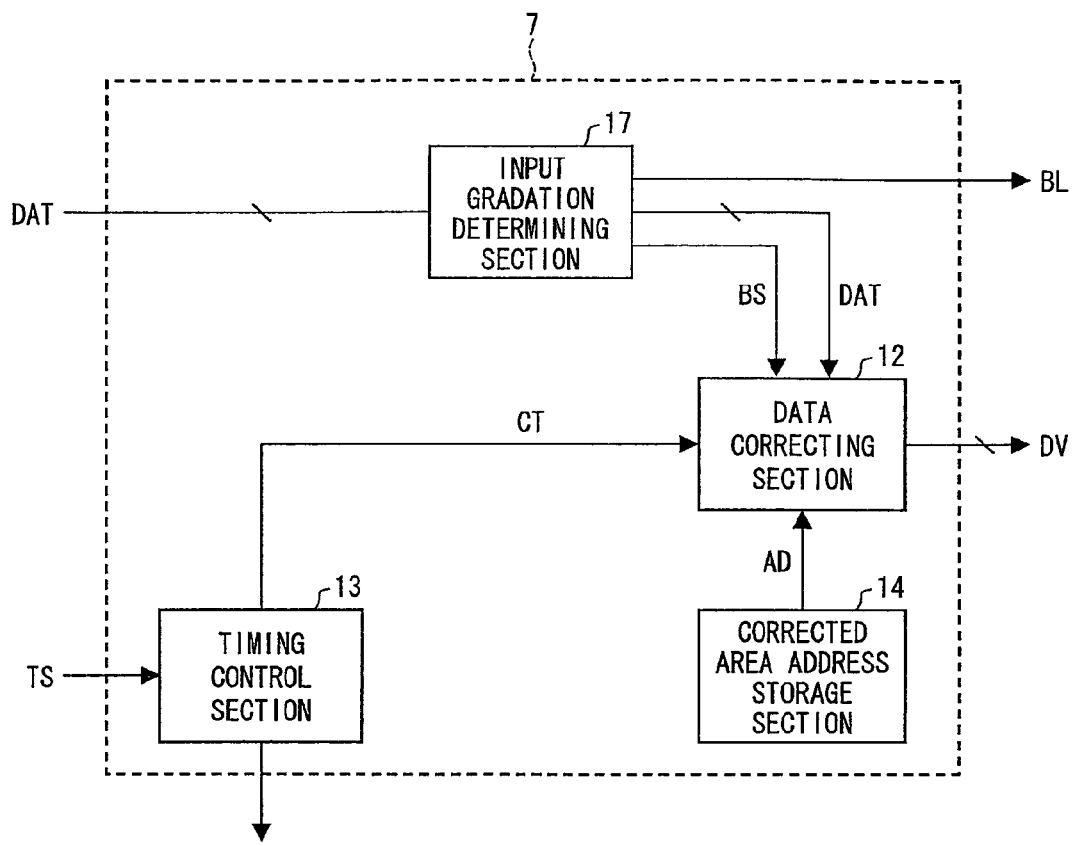
FIG. 13 is a block diagram illustrating an overall arrangement of a display control circuit shown in FIG. 12.

FIG. 13 is a block diagram illustrating an overall arrangement of the display control circuit 7 of Embodiment 2 of the present invention. The display control circuit 7 of Embodiment 2 is different from that of Embodiment 1 (see FIG. 6) in that an input gradation determining section 17 (an average gradation detecting section and a backlight control section) is added. The input gradation determining section 17 calculates an average gradation of image signals of the display area end portion A2 out of the image signals DAT, and outputs, based on the average gradation thus calculated, the backlight control signal BL for controlling a driving current for the backlight in the display area end portion A2 and a control signal BS for selecting a corrected gradation pattern. The control signal BS thus outputted is supplied to a data correcting section 12.

Figure 14:
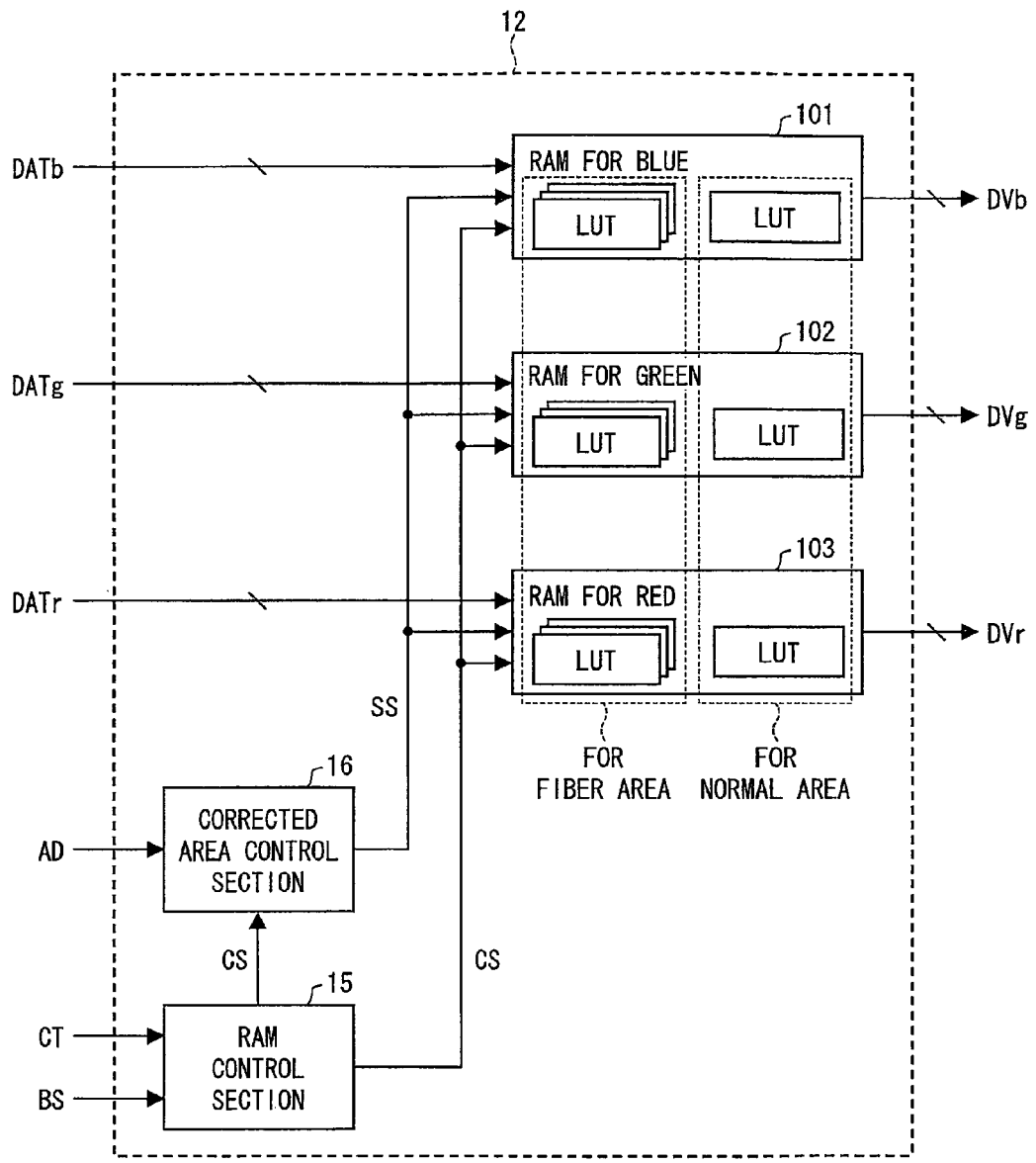
FIG. 14 is a block diagram illustrating an overall arrangement of a data correcting section shown in FIG. 13.

FIG. 14 is a block diagram illustrating an arrangement of the data correcting section 12 included in the display control circuit 7 of Embodiment 2 of the present invention. The arrangement of the data correcting section 12 is basically same as that of Embodiment 1, but is different from that of Embodiment 1 in that each of the RAMs for RGB includes a plurality of LUTs for the display area end portion A2 (fiber area) in conformity with the number of gradation correction patterns. The control signal BS is supplied to a RAM control section 15 in order to select an LUT for the display area end portion A2 which LUT corresponds to a correction gradation pattern selected based on the average gradation of the image signals of the display area end portion A2 out of the image signals DAT. The RAM control section 15 supplies, to a corresponding one of the RAMs for RGB, a RAM control signal CS for selecting the LUT compatible with the correction gradation pattern selected by the control signal BS.

Figure 15:
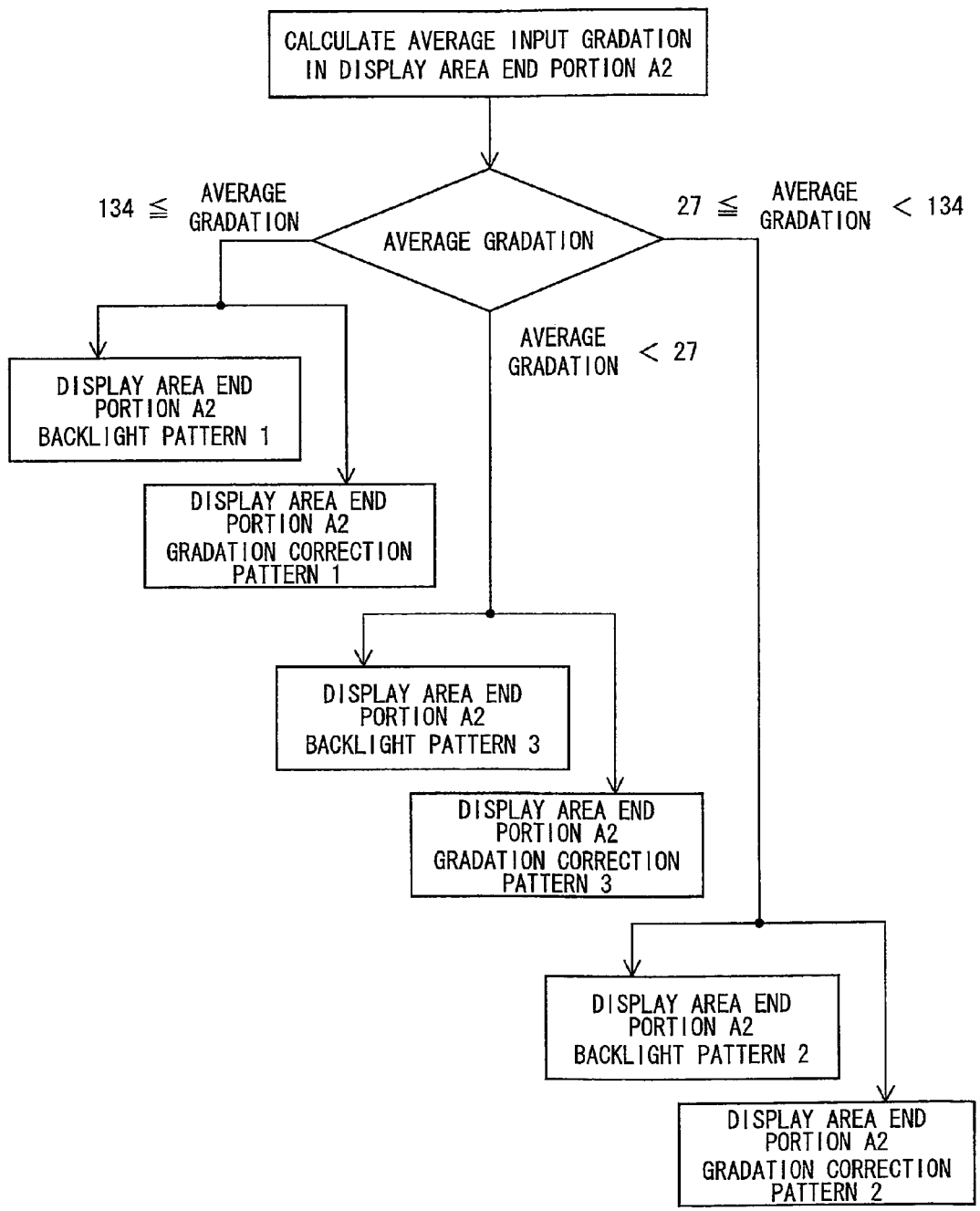
FIG. 15 is a flow chart showing an example of a method for selecting a backlight correction pattern and a gradation correction pattern of Embodiment 2 of the present invention.

FIG. 15 is a flow chart showing a case where the way in which a driving current for the backlight is controlled and the way in which gradation correction of image signals is carried out are classified into three patterns on a basis of the average gradation of the image signals of the display area end portion A2. FIG. 15 shows three patterns, i.e., a case where the average gradation is not less than 134, a case where the average gradation is not less than 27 and less than 133, and a case where the average gradation is less than 27. In the case where the average gradation is not less than 134, a backlight pattern 1 and a gradation correction pattern 1 are used as correction patterns for the display area end portion A2. In the case where the average gradation is not less than 27 and less than 133, a backlight pattern 2 and a gradation correction pattern 2 are used as correction patterns for the display area end portion A2. In the case where the average gradation is less than 27, a backlight pattern 3 and a gradation correction pattern 3 are used as correction patterns for the display area end portion A2. The number of patterns and the reference gradations for the classification can be obtained as described below with reference to the following Equation 1 for example.

$$d \text{ luminance(display area end portion)}/d \text{ gradation} \\ \text{(display area end portion)} \geq d \text{ luminance(normal} \\ \text{display area)}/d \text{ gradation(normal display area)} \quad \text{(Equation 1)}$$

Figure 16:
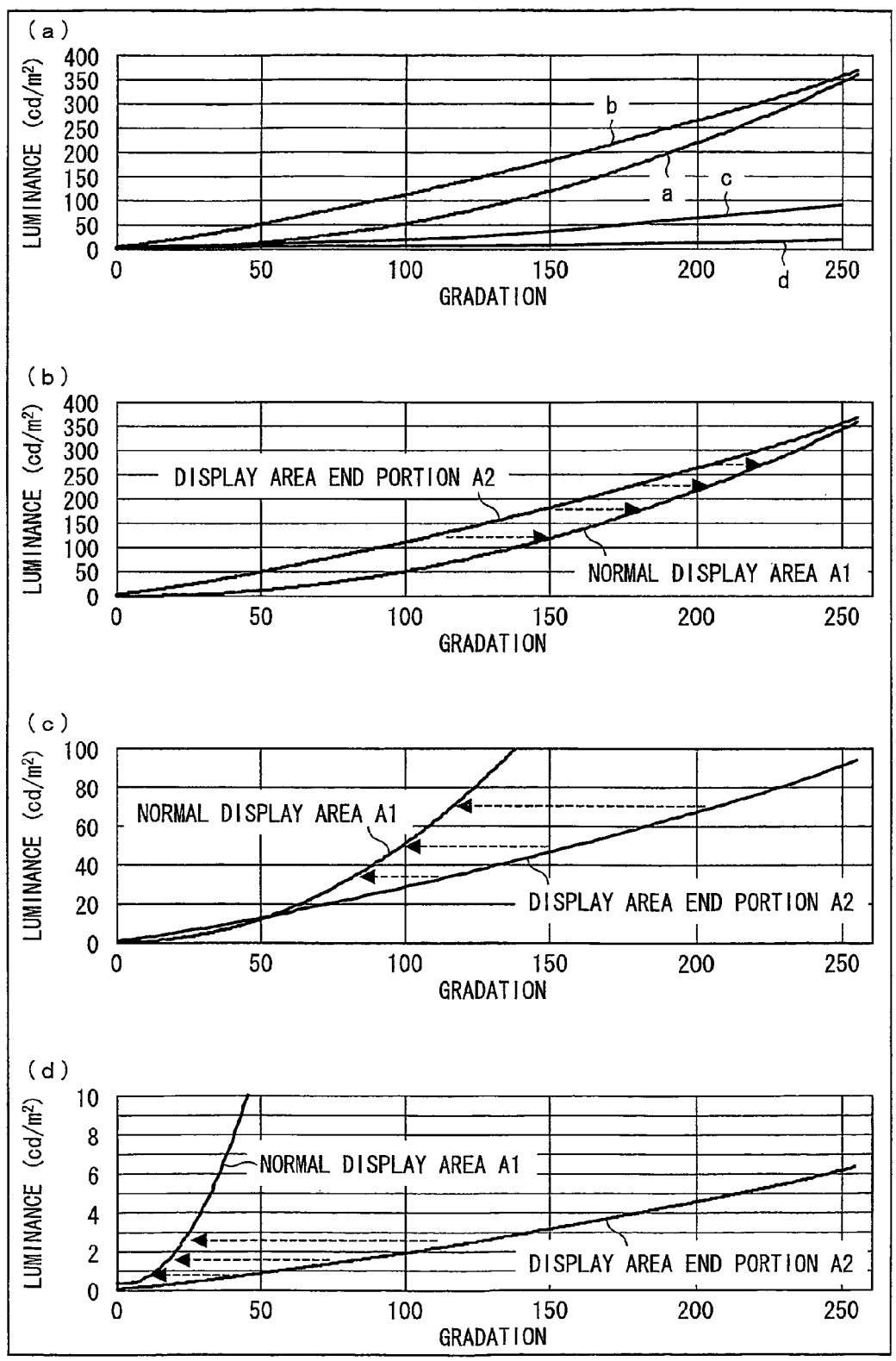
FIG. 16 is a graph showing gradation-luminance characteristics of the liquid crystal display device for the respective backlight correction patterns of Embodiment 2 of the present invention.
Figure 18:
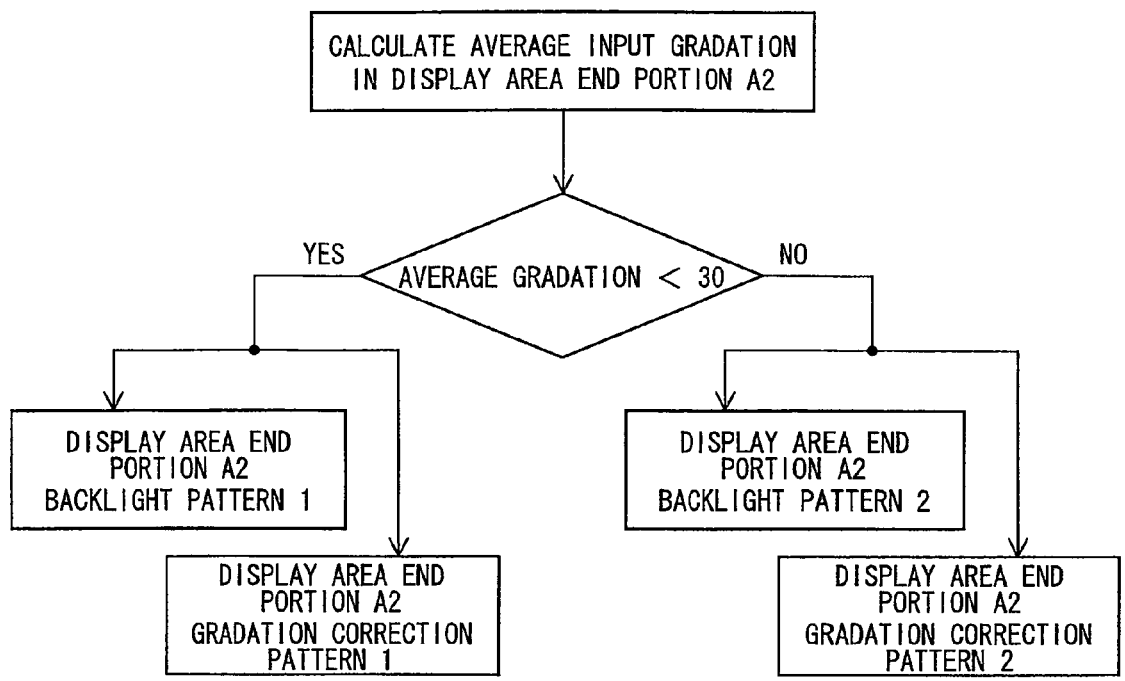
FIG. 18 is a flow chart showing another example of the method for selecting a backlight correction pattern and a gradation correction pattern of Embodiment 2 of the present invention.

(a) of FIG. 16 is a graph showing how the reference average gradation values (134 and 27) shown in the flow chart of FIG. 15 are determined based on the expression 1 in a case where the surface luminance of the liquid crystal display device in the display area end portion A2 at the maximum gradation is adjusted to the surface luminance of the liquid crystal display device in the normal display area A1 at the maximum gradation as shown in FIG. 9 of Embodiment 1.

More specifically, (a) of FIG. 16 shows (i) a gamma characteristic (curve a) of the liquid crystal display device that is obtained before image signal correction in the normal display area A1 and (ii) gamma characteristics (curves b, c, and d) of the liquid crystal display device in the display area end portion A2 that are respectively obtained in a case where a light amount of the backlight is adjusted in accordance with the backlight patterns 1 through 3 selected based on a value of the average gradation. Note that (b) through (d) of FIG. 16 show, as gradation-luminance curves, the backlight patterns 1 through 3 respectively.

Explained first is how the reference average gradation value (134) for switching between the backlight pattern 1 and the backlight pattern 2 is determined. A gradation range satisfying the condition of the expression 1 is examined by comparing (i) the gamma characteristic (the curve b in (a) of FIG. 16) of the liquid crystal display device in the display area end portion A2 that is obtained in a case where the light amount of the backlight is adjusted in accordance with the backlight pattern 1 and (ii) the gamma characteristic (the curve a in (a) of FIG. 16) of the liquid crystal display device in the normal display area A1 that is obtained in a case where the light amount of the backlight is adjusted in accordance with the backlight pattern 1. The result reveals that the gradation range of less than 134 satisfies the expression 1, but the gradation range of not less than 134 does not satisfy the expression 1.

Accordingly, in a region which does not satisfy the expression 1 (region in which the slope of the curve a is larger than that of the curve b), i.e., in the gradation range of not less than 134, the backlight pattern 1 is used so that the driving current for the backlight is not reduced. As a result, the surface luminance of the liquid crystal display device at the maximum gradation is maintained at 360 cd/m², as shown in (b) of FIG. 16.

Next, in a region which satisfies the expression 1 (region in which the slope of the curve b is larger than that of the curve a), i.e., in the gradation range of less than 134, the backlight pattern 2 is used so that the driving current for the backlight is reduced. That is, as the average gradation in the display area end portion A2 becomes lower, the slope of the gamma characteristic in the display area end portion A2 becomes larger. Accordingly, gradations corresponding to the normal display area A1 cannot be sufficiently expressed (different gradations have an identical luminance). On this account, at the low gradations, the driving current for the backlight in the display area end portion A2 is reduced, and image signals are corrected in accordance with a gradation correction pattern for the display area end portion A2 so that the gradations corresponding to the normal display area A1 can be sufficiently expressed. The gradation correction pattern is described later.

According to the gamma characteristic (see the curve c in (a) of FIG. 16) corresponding to the backlight pattern 2, the driving current for the backlight is reduced so that the gradations corresponding to the normal display area A1 can be sufficiently expressed (so that different gradations do not have an identical luminance) in the gradation range of less than 134. In the present embodiment, the light amount of the backlight is adjusted so that the surface luminance of the liquid crystal display device at the maximum gradation becomes approximately 100 cd/m$^2$, as shown in (c) of FIG. 16.

The following describes how the reference average gradation value (27) for switching between the backlight pattern 2 and the backlight pattern 3 is determined. In a similar manner to that described above, a gradation range satisfying the condition of the expression 1 is examined by comparing (i) the gamma characteristic (the curve c in (a) of FIG. 16) of the liquid crystal display device in the display area end portion A2 that is obtained in a case where the light amount of the backlight is adjusted in accordance with the backlight pattern 2 and (ii) the gamma characteristic (the curve a in (a) of FIG. 16) of the liquid crystal display device in the normal display area A1 that is obtained in a case where the light amount of the backlight is adjusted in accordance with the backlight pattern 2. The result reveals that the gradation range of not less than 27 does not satisfy the expression 1, but the gradation range of less than 27 satisfies the expression 1.

Accordingly, in a region that does not satisfy the expression 1, the backlight pattern 2 is used so that the driving current for the backlight is not reduced, whereas in a region that satisfies the expression 1, the backlight pattern 3 is used so that the driving current for the backlight is further reduced. The way in which the driving current for the backlight is reduced is also similar to that described above. In the present embodiment, the light amount of the backlight is adjusted so that the surface luminance of the liquid crystal display device at the maximum gradation becomes approximately 6 cd/m$^2$, as shown in (d) of FIG. 16.

As described above, the way in which the driving current for the backlight is controlled is classified into three patterns. As a result, the gradations corresponding to the normal display area A1 can be sufficiently expressed by additionally correcting image signals in the case where the average gradation of the display area end portion A2 is not less than 134. The same is true for the case where the average gradation of the display area end portion A2 is not less than 27 and not more than 133 and for the case where the average gradation of the display area end portion A2 is not more than 26.

Note that although the above description has dealt with a case where the average gradation for the entire display area end portion A2 is obtained, the present embodiment is not limited to this. For example, in a case where light sources such as LEDs are disposed in a matrix to fit the display area of the liquid crystal display panel 2, and are combined with a diffusion plate or the like so as to constitute a planar light source, the above control method can be applied. That is, it is also possible that (i) the display area end portion A2 is divided into a plurality of small areas, (ii) an average gradation is found for each of the small areas, and (iii) light amount and image signals corresponding to the small areas are controlled based on the flow chart of FIG. 15.

FIG. 17 shows LUTs for the gradation correction patterns 1 through 3 shown in the flow chart of FIG. 15. The gradation correction patterns 1 through 3 are associated with the backlight patterns 1 through 3 shown in (b) through (d) of FIG. 16, respectively. Each of the gradation correction pattern 1 (used in the gradation range of not less than 134), the gradation correction pattern 2 (used in the gradation range of not less than 27 and not more than 133), and the gradation correction pattern 3 (used in the gradation range of not more than 26) is adjusted so that the gamma characteristic of the display area end portion A2 approximates that of the normal display area A1 and so that the gradations corresponding to the normal display area A1 can be sufficiently expressed (so that different gradations do not have an identical luminance). As a result, a viewer can see a displayed image without a sense of strangeness as if there is no border between the areas.

More specifically, in the case of the gradation correction pattern 1, the backlight is controlled based on the backlight pattern 1 so that the driving current for the backlight is not reduced. Accordingly, in a case where luminance in the normal display area A1 and the display area end portion A2 at the maximum gradation is set to be equal to maximum luminance (e.g., 360 cd/m$^2$), an image displayed in the display area end portion A2 becomes brighter than an image displayed at the same gradation in the normal display area A1 throughout the entire gradation range. On this account, according to the gradation correction pattern 1, image signal are corrected so that an output gradation for an input gradation is lower in the display area end portion A2 than in the normal display area A1 throughout the entire gradation range.

In the case of the gradation correction pattern 2, the backlight is controlled based on the backlight pattern 2. Specifically, the driving current for the backlight is reduced so that the surface luminance of the liquid crystal display device at the maximum gradation becomes approximately 100 cd/m$^2$. On this account, according to the gradation correction pattern 2, image signals are corrected so that the gradations corresponding to the normal display area A1 can be sufficiently expressed in the low and middle gradation ranges. This makes it possible to express low and middle gradation tinges of the normal display area A1 that cannot be sufficiently expressed by the backlight pattern 1.

In the case of the gradation correction pattern 3, the backlight is controlled based on the backlight pattern 3. Specifically, the driving current for the backlight is reduced so that the surface luminance of the liquid crystal display device at the maximum gradation becomes approximately 6 cd/m$^2$. On this account, according to the gradation correction pattern 3, image signals are corrected so that the gradations corresponding to the normal display area A1 can be sufficiently expressed especially in the low gradation range. This makes it possible to express low gradation tinge of the normal display area A1 that cannot be sufficiently expressed by the backlight pattern 2. Moreover, it becomes possible to express luminance of not more than 1 cd/m$^2$ that cannot be sufficiently expressed by the backlight pattern 2. This improves contrast.

Note that although the above description has dealt with a case where the way in which the driving current for the backlight is controlled and the way in which the image signals are corrected are classified into three patterns on the basis of an average gradation, the present embodiment is not limited to this. The effects can be sufficiently obtained even in a case where two patterns are used as shown in the flow chart of FIG. 18. In this case, the effect of reducing a sense of strangeness may be smaller than the case where three patterns are used, but it is possible to simplify a design and to reduce a memory, thereby reducing a cost.

The present invention is not limited to the description of the embodiments above, but may be altered by a skilled person within the scope of the claims. An embodiment based on a proper combination of technical means disclosed in different embodiments is encompassed in the technical scope of the present invention.

In order to attain the above object, the display device of the present invention is arranged such that maximum luminance of the display device per unit area in the area where the light guide element is provided is substantially equal to that in the area where the light guide element is not provided.

According to the arrangement, luminance of the backlight is adjusted so that the maximum luminance in the area where the light guide element is provided is almost equal to that in the area where the light guide element is not provided. This produces an effect of reducing a difference in luminance from the display device between these areas so that a viewer does not feel a sense of strangeness.

In order to attain the above object, the display device of the present invention is arranged such that the backlight includes a plurality of light sources, and the number of light sources per unit area on a surface on which the light sources are disposed is larger in the area where the light guide element is provided than in the area where the light guide element is not provided.

According to the arrangement, the number of light sources per unit area on the surface on which the light sources are disposed is relatively large in the area where the light guide element is provided. This makes it possible to compensate a reduction in luminance that is caused by the light guide element.

In order to attain the above object, the display device of the present invention is arranged such that the backlight includes a plurality of light sources, and maximum luminance per light source disposed corresponding to the area where the light guide element is provided is larger than maximum luminance per light source disposed corresponding to the area where the light guide element is not provided.

According to the arrangement, light sources having relatively large maximum luminance, i.e., relatively large light emission capability are disposed in the area where the light guide element is provided. This makes it possible to compensate a reduction in luminance that is caused by the light guide element.

In order to attain the above object, the display device of the present invention is arranged so as to further include an image signal correcting section which (i) carries out gamma correction of correcting at least one of (a) an image signal to be supplied to a display element in the area where the light guide element is provided and (b) an image signal to be supplied to a display element in the area where the light guide element is not provided so that a gamma characteristic in the area where the light guide element is provided approaches that in the area where the light guide element is not provided, and (ii) outputs, as a corrected image signal, a result obtained by the gamma correction.

In order to attain the above object, the display method of the present invention includes the steps of: (a) carrying out gamma correction of correcting at least one of (i) an image signal to be supplied to a display element in the area where the light guide element is provided and (ii) an image signal to be supplied to a display element in the area where the light guide element is not provided so that a gamma characteristic in the area where the light guide element is provided approaches that in the area where the light guide element is not provided, and outputting, as a corrected image signal, a result obtained by the gamma correction; and (b) driving the display element in the area where the light guide element is provided, in accordance with the corrected image signal obtained in the step (a).

According to the arrangement, not only a difference in luminance is reduced, but also the gamma characteristic in the area where the light guide element is provided approaches that in the area where the light guide element is not provided. This produces an effect of further reducing a sense of strangeness given to a viewer.

In order to attain the above object, the display device of the present invention is arranged such that the at least one display panel includes plural kinds of display elements emitting different colors, and the image signal correcting section carries out the gamma correction with respect to at least one of the different colors.

According to the arrangement, the gamma characteristic in the area where the light guide element is provided further approaches that in the area where the light guide element is not provided. This produces an effect of further reducing a sense of strangeness given to a viewer.

In order to attain the above object, the display device of the present invention is arranged such that the at least one display panel includes plural kinds of display elements emitting different colors, and the image signal correcting section carries out the gamma correction with respect to all of the different colors.

According to the arrangement, the gamma characteristic in the area where the light guide element is provided further approaches that in the area where the light guide element is not provided. This produces an effect of further reducing a sense of strangeness given to a viewer.

In order to attain the above object, the display device of the present invention is arranged such that the image signal correcting section carries out the gamma correction in a single uniform way regardless of color.

According to the arrangement, the same gamma correction is carried out with respect to all of the different colors. That is, in a case where input gradations for every color are the same so that an achromatic color is displayed on the display device throughout all the gradations from white display to black display, all the colors have the same output gradation. This produces an effect of easily reducing a difference in luminance between the area where the light guide element is provided and the area where the light guide element is not provided so that a viewer does not feel a sense of strangeness.

In order to attain the above object, the display device of the present invention is arranged so as to further include: an average gradation detecting section which receives the image signals and detects an average gradation of the image signals supplied to the area where the light guide element is provided; and a backlight control section which controls a driving current for driving the backlight, the backlight control section reduces the driving current in a case where a value of the average gradation is lower than a reference value.

In the arrangement, since luminance per unit area in the light-emitting surface of the backlight is large in the area where the light guide element is provided, a phenomenon is observed in which luminance in the area where the light guide element is provided is higher as compared to the area where the light guide element is not provided especially at low gradations.

According to the arrangement, the luminance of the backlight is suppressed in a case where an image is displayed at a low gradation, i.e., in a case where an average gradation is lower than a reference value. As a result, the image of the low gradation can be displayed well at a gradation close to an original gradation. This produces an effect that it is possible to provide a display device that can achieve a high contrast.

In order to attain the above object, the display device of the present invention is arranged such that at least two reference values are selected so that a whole gradation range from a minimum gradation to a maximum gradation is divided into at least three gradation ranges, and the backlight control section reduces the driving current in accordance with a pattern corresponding to a gradation range including the value of the average gradation.

According to the arrangement, the whole gradation range is divided into at least three gradation ranges by at least two reference values. Accordingly, at least two gradation ranges in which the value of the average gradation is lower than the reference values are present on a low gradation side. A degree of change in luminance in response to a change in gradation varies between (i) a lower gradation range in which gradations are lower than a smaller one of the two reference values and (ii) a higher gradation range in which gradations are lower than a larger one of the two reference values out of the at least two gradation ranges.

Accordingly, it is preferable that the way in which the driving current is reduced is changed in accordance with the degree of change in luminance in response to change in gradation. That is, as the number of divisions of gradation ranges is increased so that the number of patterns for controlling the driving current for the backlight is increased, it is possible to more effectively reduce a difference in luminance and tinge between the area where the light guide element is provided and the area where the light guide element is not provided, thereby more effectively reducing a sense of strangeness given to a viewer.

In order to attain the above object, the display device of the present invention is arranged so as to further include: an average gradation detecting section which receives the image signals and detects an average gradation of the image signals supplied to the area where the light guide element is provided; and a backlight control section which controls a driving current for driving the backlight, the backlight control section reduces the driving current in a case where a value of the average gradation is lower than a reference value, and the image signal correcting section changes a pattern of the gamma correction in accordance with a pattern in which the backlight control section reduces the driving current.

This produces (i) an effect that it is possible to provide a display device that can achieve high contrast since the luminance of the backlight is suppressed in a case where an image is displayed at a low gradation, i.e., in a case where an average gradation is lower than a reference value, so that the image of the low gradation can be displayed well at a gradation close to an original gradation and (ii) an effect that it is possible to more effectively reduce a sense of strangeness given to a viewer since the gamma characteristic in the area where the light guide element is provided is caused to approach that in the area where the light guide element is not provided. Consequently, it is possible to provide a display device that is capable of higher-quality display. In order to attain the above object, the display device of the present invention is arranged such that the at least one display panel is a liquid crystal display panel.

In order to attain the above object, the display device of the present invention is arranged such that the at least one display panel comprises a plurality of display panels including a first display panel and a second display panel which is provided in proximity with or in contact with the first display panel, and a light guide element provided on the first display panel is in contact with a light guide element provided on the second display panel with no gap therebetween.

According to the arrangement, it is possible to produce an effect that a display produced by connecting a plurality of display panels each having a frame area can be perceived without a sense of strangeness as if the display is a continuous display having no frame area.

A combination of a feature in a focused claim and a feature in another claim is not limited to a combination of the feature in the focused claim and a feature in a claim cited in the focused claim. The feature in the focused claim can be combined with a feature in a claim that is not cited in the focused claim, as long as the object of the present invention can be attained.

INDUSTRIAL APPLICABILITY

The present invention is applicable to various direct-view-type display devices.

REFERENCE SIGNS LIST

1: Display device
2: Liquid crystal display panel
3: Backlight
4: Light guide element
5: Transparent cover
6a, 6b: Light path
7: Display control circuit
8: Video signal line driving circuit
9: Scanning signal line driving circuit
10: Backlight driving circuit
11: Common electrode driving circuit
12: Data correcting section
13: Timing control section
14: Corrected area address storage section
15: RAM control section
16: Corrected area control section
17: Input determining section (average gradation detecting section and backlight control section)
101: RAM for blue
102: RAM for green
103: RAM for red
110a, 110b: Polarization plate
111: TFT substrate
112: Liquid crystal layer
113: CF substrate
115: Lens sheet etc.
116: Light guide plate
117: Reflecting sheet
203: LED
A1: Normal display area
A2: Display area end portion
A3: Frame area
GL(k): Scanning signal line (k=1, 2, 3 . . . )
SL(j): Video signal line (j=1, 2, 3 . . . )
DAT (r, g, b): Image signal (red, green, blue)
DV (r, g, b): Corrected image signal (red, green, blue)
AD: Corrected area address
CT, CS, SS, BS: Control signal
BL: Backlight control signal

The invention claimed is:

1. A display device that displays an image based on image signals, comprising:
   at least one display panel having (i) a display area in which a plurality of display elements for displaying the image are disposed in a matrix and (ii) a frame area which is located at an end of the at least one display panel and in which no display element is provided;

a backlight which emits light, in a form of plane emission, towards a back surface opposite to a display surface of the display area; and a light guide element which is provided in a peripheral area on the at least one display panel and which changes a light path of part of light emitted from the plurality of display elements so that the part of light is guided to the frame area; and an image signal correcting section which,
(i) carries out gamma correction of correcting at least one of (a) an image signal to be supplied to a display element in the area where the light guide element is provided and (b) an image signal to be supplied to a display element in the area where the light guide element is not provided so that a gamma characteristic in the area where the light guide element is provided approaches that in the area where the light guide element is not provided, and
(ii) outputs, as a corrected image signal, a result obtained by the gamma correction, wherein,
luminance per unit area in a light-emitting surface of the backlight being is larger in an area where the light guide element is provided than in an area where the light guide element is not provided out of the display area.

2. The display device according to claim 1, wherein:
maximum luminance of the display device per unit area in the area where the light guide element is provided is substantially equal to that in the area where the light guide element is not provided.

3. The display device according to claim 1, wherein:
the backlight includes a plurality of light sources, and
the number of light sources per unit area on a surface on which the light sources are disposed is larger in the area where the light guide element is provided than in the area where the light guide element is not provided.

4. The display device according to claim 1, wherein:
the backlight includes a plurality of light sources, and
maximum luminance per light source disposed corresponding to the area where the light guide element is provided is larger than maximum luminance per light source disposed corresponding to the area where the light guide element is not provided.

5. The display device according to claim 1, wherein:
the at least one display panel includes plural kinds of display elements emitting different colors, and the image signal correcting section carries out the gamma correction with respect to at least one of the different colors.

6. The display device according to claim 1, wherein:
the at least one display panel includes plural kinds of display elements emitting different colors, and the image signal correcting section carries out the gamma correction with respect to all of the different colors.

7. The display device according to claim 6, wherein:
the image signal correcting section carries out the gamma correction in a single uniform way regardless of color.

8. The display device according to claim 1, further comprising:
an average gradation detecting section which receives the image signals and detects an average gradation of the image signals supplied to the area where the light guide element is provided; and
a backlight control section which controls a driving current for driving the backlight, the backlight control section reduces the driving current in a case where a value of the average gradation is lower than a reference value, and the image signal correcting section changes a pattern of the gamma correction in accordance with a pattern in which the backlight control section reduces the driving current.

9. The display device according to claim 1, wherein:
the at least one display panel is a liquid crystal display panel.

10. The display device according to claim 1, wherein:
the at least one display panel comprises a plurality of display panels including a first display panel and a second display panel which is provided in proximity with or in contact with the first display panel, and
a light guide element provided on the first display panel is in contact with a light guide element provided on the second display panel with no gap therebetween.

11. A display device that displays an image based on image signals, comprising:
at least one display panel having (i) a display area in which a plurality of display elements for displaying the image are disposed in a matrix and (ii) a frame area which is located at an end of the at least one display panel and in which no display element is provided;

a backlight which emits light, in a form of plane emission, towards a back surface opposite to a display surface of the display area;

a light guide element which is provided in a peripheral area on the at least one display panel and which changes a light path of part of light emitted from the plurality of display elements so that the part of light is guided to the frame area an average gradation detecting section which receives the image signals and detects an average gradation of the image signals supplied to the area where the light guide element is provided; and a backlight control section which controls a driving current for driving the backlight, wherein
the backlight control section reduces the driving current in a case where a value of the average gradation is lower than a reference value, and
luminance per unit area in a light-emitting surface of the backlight is larger in an area where the light guide element is provided than in an area where the light guide element is not provided out of the display area.

12. The display device according to claim 11, wherein:
at least two reference values are selected so that a whole gradation range from a minimum gradation to a maximum gradation is divided into at least three gradation ranges, and the backlight control section reduces the driving current in accordance with a pattern corresponding to a gradation range including the value of the average gradation.

13. The display device according to claim 11, wherein:
maximum luminance of the display device per unit area in the area where the light guide element is provided is substantially equal to that in the area where the light guide element is not provided.

14. The display device according to claim 11, wherein:
the backlight includes a plurality of light sources, and
the number of light sources per unit area on a surface on which the light sources are disposed is larger in the area where the light guide element is provided than in the area where the light guide element is not provided.

15. The display device according to claim 11, wherein:
the backlight includes a plurality of light sources, and
maximum luminance per light source disposed corresponding to the area where the light guide element is provided is larger than maximum luminance per light source disposed corresponding to the area where the light guide element is not provided.

16. The display device according to claim 11, wherein:
the at least one display panel is a liquid crystal display panel.

17. The display device according to claim 11, wherein:
the at least one display panel comprises a plurality of display panels including a first display panel and a second display panel which is provided in proximity with or in contact with the first display panel, and
a light guide element provided on the first display panel is in contact with a light guide element provided on the second display panel with no gap therebetween.

\* \* \* \* \*